US009835859B2

United States Patent
Furuya et al.

(10) Patent No.: US 9,835,859 B2
(45) Date of Patent: Dec. 5, 2017

(54) IMAGE DISPLAY DEVICE

(71) Applicant: Panasonic Intellectual Property Management Co., Ltd., Osaka (JP)

(72) Inventors: Hiroyuki Furuya, Osaka (JP); Takahisa Shiramizu, Saga (JP); Susumu Uragami, Osaka (JP); Yoshiro Kashiwabara, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/226,123

(22) Filed: Aug. 2, 2016

(65) Prior Publication Data

US 2017/0059861 A1 Mar. 2, 2017

(30) Foreign Application Priority Data

Aug. 25, 2015 (JP) .................. 2015-165953
Aug. 25, 2015 (JP) .................. 2015-165954

(51) Int. Cl.
*G02B 27/01* (2006.01)
*G02B 27/10* (2006.01)
*H04N 9/31* (2006.01)

(52) U.S. Cl.
CPC ..... *G02B 27/0101* (2013.01); *G02B 27/0149* (2013.01); *G02B 27/104* (2013.01); *H04N 9/3129* (2013.01); *B60K 2350/2052* (2013.01); *G02B 2027/014* (2013.01); *G02B 2027/0114* (2013.01); *G02B 2027/0159* (2013.01)

(58) Field of Classification Search
CPC ............ G02B 27/0101; G02B 27/01; G02B 2027/011; G02B 2027/014; G02B 2027/0127; G02B 2027/0141; G02B 2027/0154; G02B 2027/0181; G02B 27/0149; G02B 27/0179; G02B 2027/0118; G02B 2027/0123
USPC ................... 345/7; 359/630; 307/9.1
See application file for complete search history.

(56) References Cited

U.S. PATENT DOCUMENTS

| | | | |
|---|---|---|---|
| 2009/0160736 A1* | 6/2009 | Shikita ............... | G02B 27/0101 345/7 |
| 2013/0188259 A1* | 7/2013 | Nakamura ......... | G02B 27/0101 359/630 |
| 2016/0161833 A1* | 6/2016 | Watanabe ............. | B60K 35/00 345/7 |

FOREIGN PATENT DOCUMENTS

JP 2009-150947 7/2009

* cited by examiner

*Primary Examiner* — Koosha Sharifi-Tafreshi
(74) *Attorney, Agent, or Firm* — McDermott Will & Emery LLP

(57) ABSTRACT

An image display device includes a light source that emits a light beam, a screen, a scanning section that scans the screen with the light beam, an optical system, a drive section, and a screen drive circuit. The optical system generates a virtual image by using the light beam that has passed through the screen. The drive section moves the screen at least in parallel to a travel direction of the light beam. The screen drive circuit contains a drive signal table that stores an information group for use in generating a drive signal tailored to stop the screen at different stop locations over different stop periods. The screen drive circuit selects first information in the drive signal table which is associated with displaying of an image and supplies the drive section with a first drive signal generated from the first information.

11 Claims, 16 Drawing Sheets

LASER LIGHT BEAM

FIG. 10A

STOP PATTERN

| NUMBER OF STOPS | STOP LOCATION | STOP PERIOD | DRIVE SIGNAL NUMBER |
|---|---|---|---|
| 1 | P1 | T1 | 1 |
| 1 | P1 | T2 | 2 |
| ⋮ | ⋮ | ⋮ | ⋮ |
| 1 | P2 | T1 | k |
| ⋮ | ⋮ | ⋮ | ⋮ |
| 2 | P1, P2 | T1, T1 | m |
| ⋮ | ⋮ | ⋮ | ⋮ |
| 3 | P1, P2, P3 | T1, T1, T1 | n |
| ⋮ | ⋮ | ⋮ | ⋮ |

FIG. 10B

| DRIVE SIGNAL NUMBER | GENERATION INFORMATION |
|---|---|
| 1 | F1 |
| 2 | F2 |
| 3 | F3 |
| ⋮ | ⋮ |

IMAGE DISPLAY DEVICE

BACKGROUND

1. Technical Field

The present disclosure relates to an image display device, and more specifically to an image display device suitable for being mounted in a vehicle or other movable body, for example.

2. Description of the Related Art

In recent years, image display devices called head-up displays to be mounted in vehicles or other movable bodies have been developed. When a head-up display is mounted in a vehicle, for example, the head-up display modulates light based on image information and irradiates a windshield with the modulated light. Then, the light is reflected by the windshield and incident on the driver's eyes. This enables the driver to see a virtual image based on the image information in front of the windshield. For example, a vehicle speed or an ambient temperature can be displayed as a virtual image. Studies are currently being conducted to display, as virtual images, a navigation image and an image for calling driver's attention to passengers, for example.

Some head-up displays, as described above, are equipped with a laser light source including a semiconductor laser, as their light source. This configuration scans a screen with a laser light beam modulated with a video signal. Then, the laser light beam is diffused by the screen whereby the driver's eyes are irradiated with the light incident from a wider area. This prevents the driver's eye from leaving the irradiated area even if he or she moves the head to some degree. Consequently, the driver can see the image (virtual image) appropriately and stably.

The head-up display configured as above moves the screen in parallel to a travel direction of the laser light beam, thereby displaying an image that has a depth. Unexamined Japanese Patent Publication No. 2009-150947 describes a configuration in which a screen moves in parallel to a travel direction of a laser light beam.

SUMMARY

According to a first aspect of the present disclosure, an image display device includes a light source that emits a light beam, a screen, a scanning section, an optical system, a drive section, and a screen drive circuit that drives the drive section. The screen is scanned with the light beam to create an image. The scanning section scans the screen with the light beam emitted from the light source. The optical system generates a virtual image by using the light beam that has passed through the screen. The drive section moves the screen at least in parallel to a travel direction of the light beam. The screen drive circuit contains a drive signal table that stores an information group for use in generating a drive signal that causes the screen to reciprocate over a predetermined period. The drive signal table is configured such that the information group is tailored to stop the screen at different stop locations over different stop periods; the stop locations are confined within a range of the reciprocation of the screen. The screen drive circuit selects first information in the drive signal table which is associated with displaying of the image and supplies the drive section with a first drive signal generated from the first information.

In the image display device according to the first aspect, generating the drive signal in the above manner can smoothly position the screen that has moved at a high speed, at a stop location without causing any oscillations.

According to a second aspect of the present disclosure, an image display device includes a light source that emits a light beam, a screen, a scanning section, an optical system, a drive section, and a screen drive circuit that drives the drive section. The screen is scanned with the light beam to create an image. The scanning section scans the screen with the light beam emitted from the light source. The optical system generates a virtual image by using the light beam that has passed through the screen. The drive section moves the screen at least in parallel to a travel direction of the light beam. The screen drive circuit generates a drive signal by superimposing an acceleration/deceleration signal upon a periodic signal at a timing of stopping the screen. The drive signal is used to move the screen; the acceleration/deceleration signal is used to stop the screen; and the periodic signal is used to cause the screen to reciprocate monotonously over a predetermined period.

In the image display device according to the second aspect, generating the drive signal in the above manner can smoothly position the screen that has moved at a high speed, at a stop location without causing any oscillations.

According to the present disclosure, as described above, it is possible to provide an image display device that can smoothly and temporarily stop a screen reciprocating, thereby appropriately displaying an image that has no depth.

Effects and advantages of the present disclosure will become more apparent from the exemplary embodiments described later. However, it should be noted that exemplary embodiments described later are examples for implementing the present disclosure; therefore, the present disclosure is not limited to the exemplary embodiments.

BRIEF DESCRIPTION OF THE DRAWINGS

FIG. 10A is a configuration of a selection table contained in an image processing circuit in the first exemplary embodiment;

FIG. 10B is a configuration of a drive signal table contained in the screen drive circuit in the first exemplary embodiment;

DETAILED DESCRIPTION OF EMBODIMENT

Figure 1A:
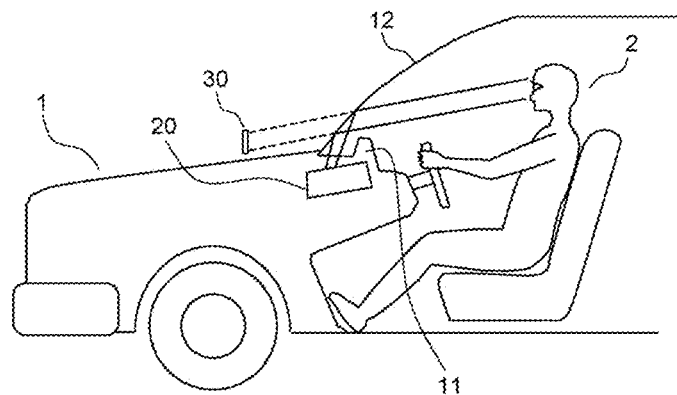
FIG. 1A is a schematic view illustrating an application of an image display device in a first exemplary embodiment.

Prior to a description of exemplary embodiments of the present disclosure, a problem with a conventional image display device will be described. In the image display device disclosed in Unexamined Japanese Patent Publication No. 2009-150947, the screen reciprocates along an optical axis with a predetermined movement stroke. During the movement of the screen, the image display device displays an image that has a depth by scanning the screen with a laser light beam. During the stop of the screen, the image display device displays an image that has no depth by scanning the screen with a laser light beam. Therefore, in order to display an image that has no depth, it is necessary to temporarily stop the screen moving with the movement stroke. In addition, it is necessary to smoothly stop the screen that has moved at a high speed without causing any oscillations.

In view of the above problem, the present disclosure provides an image display device that can smoothly and temporarily stop a screen reciprocating, thereby appropriately displaying an image that has no depth.

Some exemplary embodiments of the present disclosure will be described below with reference to the accompanying drawings. For the sake of convenience, an X axis, a Y axis, and a Z axis, which are orthogonal to one another, are described in the drawings as appropriate.

First Exemplary Embodiment

Figure 1B:
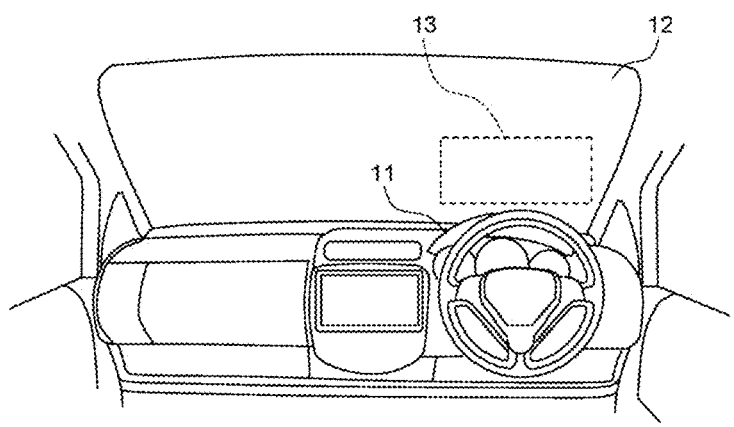
FIG. 1B is a schematic view illustrating the application of the image display device in the first exemplary embodiment.

FIG. 1A and FIG. 1B are schematic views illustrating an application of image display device 20. More specifically, FIG. 1A illustrates the interior of vehicle 1 as seen from the side; FIG. 1B illustrates a view as seen from the interior of vehicle 1 in a running direction.

This exemplary embodiment is an application of the present disclosure to a head-up display to be mounted in a vehicle. As illustrated in FIG. 1A, image display device 20 is installed in dashboard 11 of vehicle 1.

As illustrated in FIG. 1A and FIG. 1B, image display device 20 irradiates projection area 13, which is a lower part of windshield 12 near the driver seat, with a laser light beam modulated with a video signal. Then, the laser light beam is reflected on projection area 13 and incident on a horizontally long region (eye box region) in the vicinity of the eyes of driver 2. As a result, predetermined image 30 appears within the field of front view of driver 2 as a virtual image. This enables driver 2 to see image 30, or the virtual image, that overlaps a landscape in front of windshield 12. In other words, image display device 20 creates image 30, or the virtual image, within a space in front of projection area 13 of windshield 12.

Figure 1C:
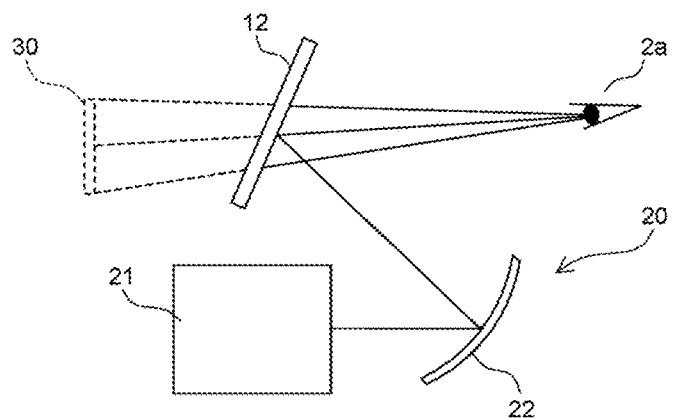
FIG. 1C is a schematic view illustrating a configuration of the image display device in the first exemplary embodiment.

FIG. 1C is a schematic view illustrating a configuration of image display device 20.

Image display device 20 includes illumination light generator 21 and mirror 22. Illumination light generator 21 emits a laser light beam modulated with a video signal. Mirror 22 has a reflective surface formed in a curved shape, and the reflective surface reflects the laser light beam emitted from illumination light generator 21 to windshield 12. Then, the laser light beam is reflected by windshield 12 and incident on eyes 2a of driver 2. The optical system in illumination light generator 21 and mirror 22 are designed such that image 30, or the virtual image, having a predetermined size appears in front of windshield 12.

Figure 2:
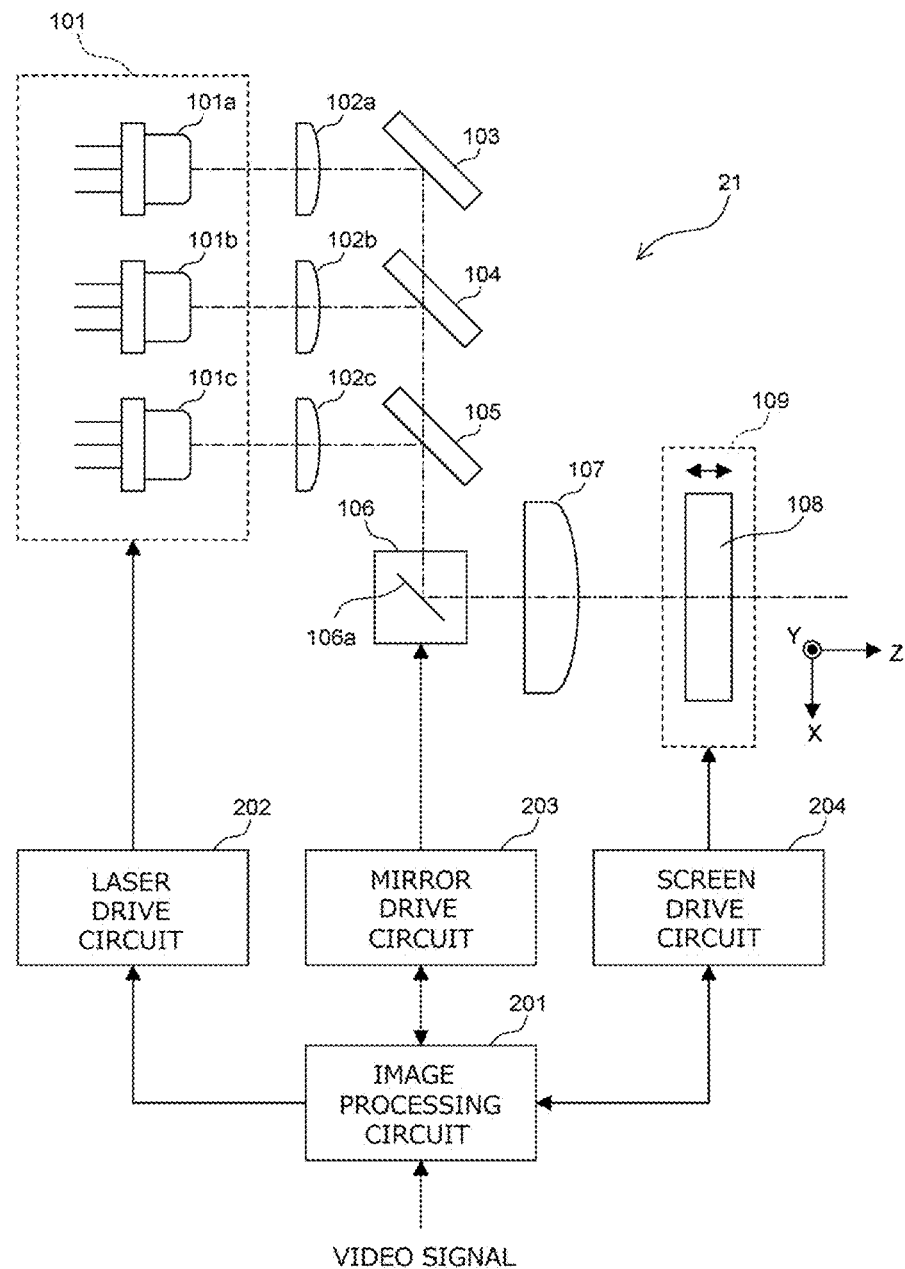
FIG. 2 is a diagram illustrating a configuration of an illumination light generator in the image display device and a configuration of a circuit of the illumination light generator in the first exemplary embodiment.

FIG. 2 illustrates a configuration of illumination light generator 21 in image display device 20 and a configuration of a circuit of illumination light generator 21.

Illumination light generator 21 includes light source 101, collimator lenses 102a, 102b, 102c, mirror 103, dichroic mirrors 104, 105, scanning section 106, correcting lens 107, screen 108, and drive section 109.

Light source 101 includes three laser light sources 101a, 101b, 101c. Laser light source 101a emits a laser light beam in a red wavelength range; laser light source 101b emits a laser light beam in a green wavelength range; and laser light source 101c emits a laser light beam in a blue wavelength range. In this exemplary embodiment, light source 101 is provided with three laser light sources 101a, 101b, 101c in order to display a color image as image 30. However, if image display device 20 displays a monochrome image as image 30, light source 101 may be provided with a single laser light source corresponding to the color of the image.

Each of laser light sources 101a, 101b, 101c may be formed of a semiconductor laser, for example.

The laser light beam emitted from laser light source 101a is converted into a collimated light beam by collimator lens 102a; the laser light beam emitted from laser light source 101b is converted into a collimated light beam by collimator lens 102b; and the laser light beam emitted from laser light source 101c is converted into a collimated light beam by collimator lens 102c. In addition, the laser light beam emitted from each of laser light sources 101a, 101b, 101c is shaped into a circular beam by an aperture (not illustrated). Alternatively, shaping lenses, each of which shapes a laser light beam into a circular beam and converts the circular beam into a collimated light beam, may be used instead of collimator lens 102a, 102b, 102c. In this case, the aperture is unnecessary.

After the laser light beams of the predetermined colors have been emitted from laser light sources 101a, 101b, 101c, the optical axes of the respective laser light beams are aligned with one another by mirror 103 and two dichroic mirrors 104, 105. The red laser light beam that has passed through collimator lens 102a is reflected almost totally by mirror 103. The red laser light beam that has reflected by mirror 103 passes through dichroic mirror 104, and the green laser light beam that has passed through collimator lens 102b is reflected by dichroic mirror 104. Both of the red laser light beam that has passed through dichroic mirror 104 and the green laser light beam that has been reflected by dichroic mirror 104 pass through dichroic mirror 105. In addition, the blue laser light beam that has passed through collimator lens 102c is reflected by dichroic mirror 105. Mirror 103 and two dichroic mirrors 104, 105 are disposed such that the optical axes of the laser light beams of the predetermined colors emitted from laser light sources 101a, 101b, 101c are aligned with one another.

The red and green laser light beams that have passed through dichroic mirror 105 and the blue laser light beam that has been reflected by dichroic mirror 105 are reflected by scanning section 106. Scanning section 106 may be formed of a MEMS (micro electro mechanical system) mirror, for example. More specifically, the red and green laser light beams that have passed through dichroic mirror 105 and the blue laser light beam that has been reflected by dichroic mirror 105 are incident on mirror 106a of scanning section 106. Scanning section 106 rotates mirror 106a around axes parallel to the X and Y axes in accordance with a drive signal. By rotating mirror 106a in this manner, a direction in which the laser light beams are reflected by scanning section 106 can be varied within the X-Z plane and the Y-Z plane. In this way, scanning section 106 scans screen 108 with the laser light beams of the predetermined colors, as described later.

In this exemplary embodiment, scanning section 106 employs a biaxially driven MEMS mirror; however, scanning section 106 may employ any other configurations. As one example, scanning section 106 may employ a combination of a mirror that is driven to rotate around an axis parallel to the Y axis and a mirror that is driven to rotate around an axis parallel to the X axis.

Correcting lens 107 is designed such that the laser light beams of the predetermined colors travel in the positive direction along the Z axis, independently of an angle at which the laser light beams have been reflected by scanning section 106. By scanning screen 108 with the laser light beams, an image can be created, and the laser light beams incident on screen 108 are scattered within the surrounding region of eyes 2a (eye box region) of driver 2. A configuration of screen 108 will be described later with reference to FIG. 4A to FIG. 6C.

Drive section 109 causes screen 108 to reciprocate in the directions parallel to the travel direction of the laser light beams (reciprocate along the Z-axis directions). A configuration of drive section 109 will be described later with reference to FIG. 3A and FIG. 3B.

Image processing circuit 201 includes an arithmetic processing unit, such as a CPU (central processing unit), and a memory. When receiving a video signal, image processing circuit 201 processes this video signal, controlling laser drive circuit 202, mirror drive circuit 203, and screen drive circuit 204. Laser drive circuit 202 varies intensities of laser light beams emitted from laser light sources 101a, 101b, 101c, in accordance with a control signal received from image processing circuit 201. Mirror drive circuit 203 drives mirror 106a of scanning section 106 in accordance with a control signal received from image processing circuit 201. Screen drive circuit 204 drives screen 108 in accordance with a control signal received from image processing circuit 201. Control performed by image processing circuit 201 during an image display operation will be described later with reference to FIG. 4B.

Figure 3A:
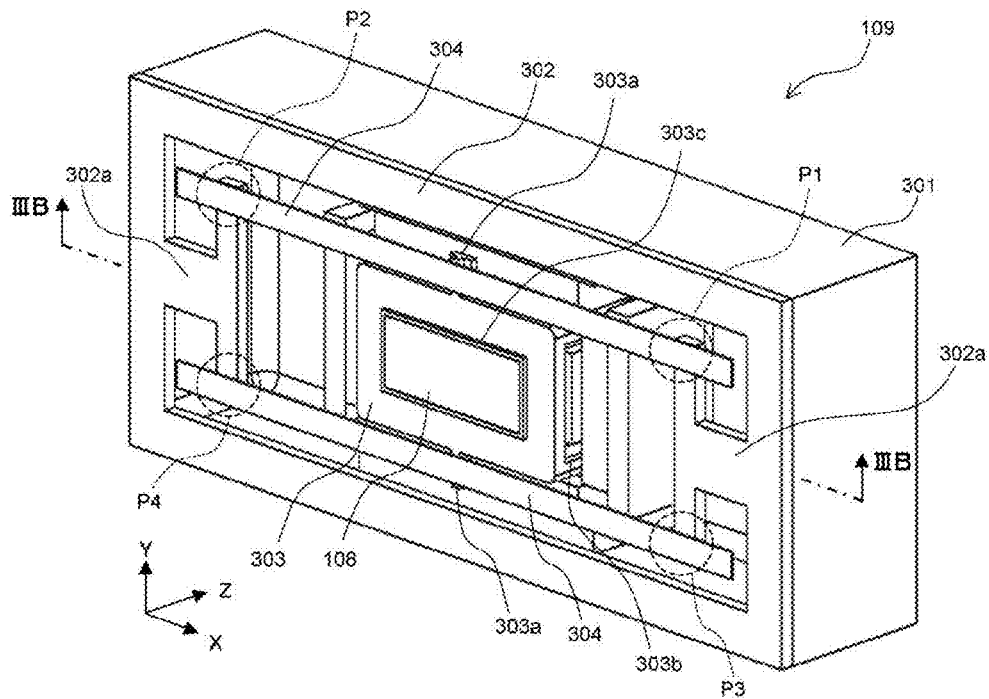
FIG. 3A is a perspective view illustrating a configuration of a drive section in the first exemplary embodiment.
Figure 3B:
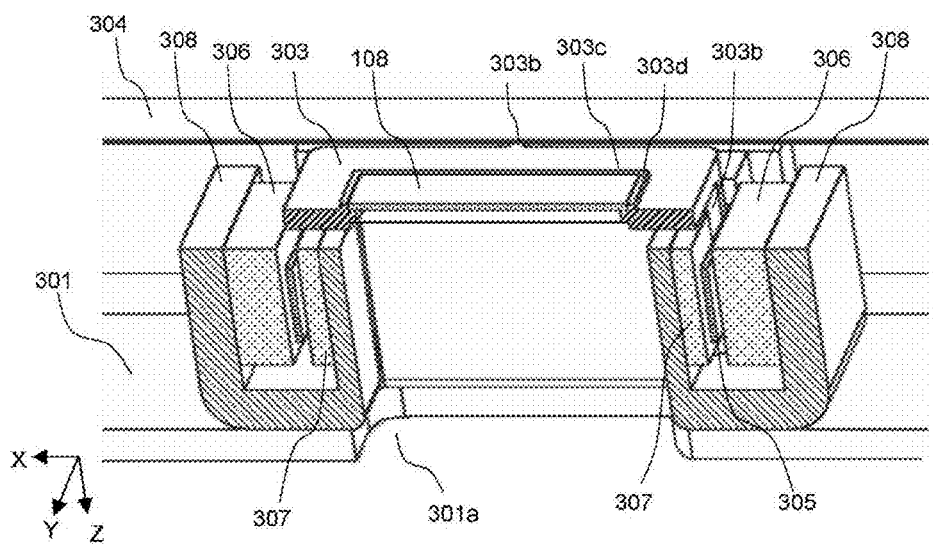
FIG. 3B is a cross-sectional view illustrating a part of the drive section in the first exemplary embodiment.

FIG. 3A illustrates a configuration of drive section 109 in perspective; FIG. 3B illustrates a cross section of a portion of drive section 109 in FIG. 3A including holder 303; this cross section is parallel to the X-Z plane and taken along a central line in the Y axis (line IIIB-IIIB).

Drive section 109 is symmetric with respect to the Y axis and X axis. Drive section 109 includes housing 301, support plate 302, holder 303, two plate springs 304, coil 305, magnets 306, 307, and yokes 308. Housing 301 has a rectangular shape with an opening on the negative side with respect to the Z axis. Support plate 302 is attached to this negative side of housing 301.

Support plate 302 has support parts 302a that each have substantially a T-shape and protrude inwardly, or in positive and negative directions with respect to the X axis. Each of two plate springs 304 is bonded to both support parts 302a. Plate spring 304 positioned on the upper side is fixed to support part 302a at locations P1, P2, whereas plate spring 304 positioned on the lower side is fixed to support part 302a at locations P3, P4. Each of two plate springs 304 is disposed in parallel to the X axis.

Holder 303 is bonded and fixed to two plate springs 304 at their longitudinal center. Holder 303 has two projections 303a protruding from the center with respect to the X axis in the positive and negative directions with respect to the Y axis. Projections 303a are bonded and fixed to respective plate springs 304. Holder 303 has a rectangular shape with four rounded corners in a plan view; legs 303b are formed in holder 303 so as to protrude from the respective corners in the positive direction with respect to the Z axis. Coil 305 is attached to holder 303 so as to be wound around four legs 303b. Holder 303 may be made of a nonmagnetic material, such as a resin.

Holder 303 is provided with opening 303c having a rectangular shape, and screen 108 is attached to holder 303 so as to cover opening 303c. Steps 303d are formed in upper portions of holder 303 close to opening 303c. When bonded and fixed to holder 303, screen 108 engages with step 303d. Opening 301a is formed in the bottom surface of housing 301 opposite screen 108. The laser light beams travel through opening 301a and then reach mirror 22 (see FIG. 1C) after having passed through screen 108 in the positive direction with respect to the Z axis.

As illustrated in FIG. 3B, magnets 306, 307 are disposed with coil 305 therebetween which is fixed to and wound around four legs 303b of holder 303 in a rectangular shape. Yokes 308 each having a substantially U-shape are disposed on the bottom surface of housing 301, and magnets 306, 307 are disposed on the inner surface of each yoke 308.

Although FIG. 3B illustrates magnets 306, 307 disposed on the two sides of coil 305 wound in a rectangular shape, other two magnets are also disposed on the remaining sides of coil 305 with the same configuration. The magnetic poles of magnets 306, 307 and the other magnets are adjusted such that each of magnets 306, 307 and the other magnets produces a driving force in the positive or negative direction with respect to the Z axis in response to a current flowing through coil 305. By switching the flow directions of the current in coil 305, the moving directions of holder 303 can be switched. Furthermore, by moving holder 303 in this manner, screen 108 can be moved along the Z axis together with holder 303.

Drive section 109 is provided with an encoder (not illustrated) that detects a location of holder 303 on the Z axis, namely, a location of screen 108 on the Z axis and then outputs a signal representative of the detected location. This encoder includes, for example a gage that is mounted in holder 303 and moves together with holder 303 and a sensor that is mounted in housing 301 and detects the gage in an optical manner. However, the encoder may employ any other configurations that can detect a location of holder 303 on the Z axis.

Figure 4A:
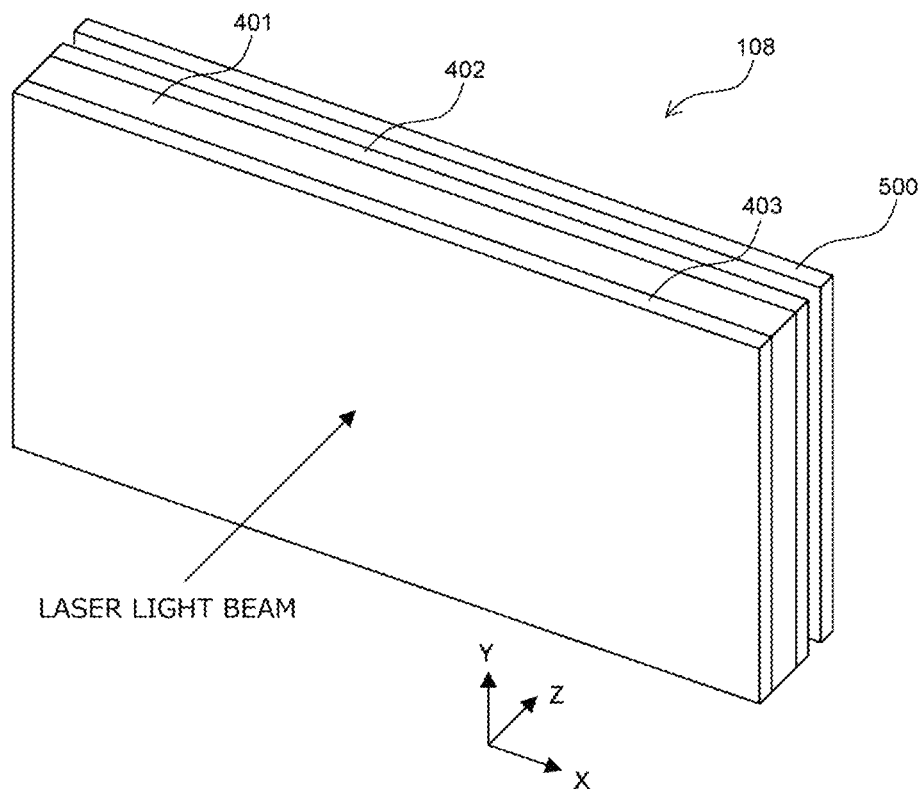
FIG. 4A is a perspective, schematic view illustrating a configuration of a screen in the first exemplary embodiment.

FIG. 4A schematically illustrates a configuration of screen 108 in perspective.

In this exemplary embodiment, screen 108 includes base material 401, microlens array 402, bead aggregation 403, and mask 500. Microlens array 402 and bead aggregation 403 are formed over both surfaces of base material 401. Base material 401 is integrated with mask 500 with a spacer (not illustrated) therebetween, thereby forming screen 108.

Base material 401 has a rectangular shape in a plan view and is made of a transparent material. Base material 401 may be made of a transparent resin, such as PET (polyethylene terephthalate).

Microlens array 402 is formed over the surface (light emission surface) of base material 401 from which a laser light beam is to be emitted. Microlens array 402 may be formed by, for example coating the light emitting surface of base material 401 with a resin material and then subjecting this resin material to a roll forming process.

Bead aggregation 403 is formed over the surface (light incident surface) of base material 401 on which a laser light beam is incident. Bead aggregation 403 is formed by coating the light incident surface of base material 401 with beads each containing a resin.

The materials for microlens array 402 and bead aggregation 403 and the method for forming microlens array 402 and bead aggregation 403 are not limited to the above. Other materials and methods for forming microlens array 402 and bead aggregation 403 may be possible. For example, beads 403a may be made of glass instead of a resin.

Figure 5A:
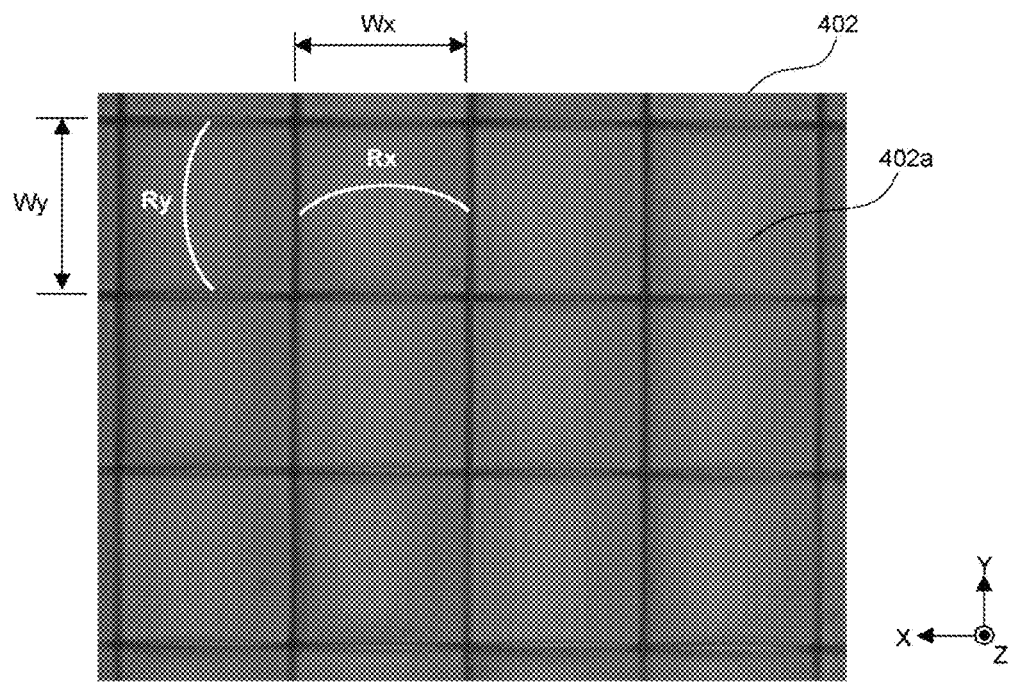
FIG. 5A is a picture image of a microlens array in the first exemplary embodiment.

FIG. 5A illustrates is a picture image obtained by photographing a part of microlens array 402 at the positive side with respect to the Z axis.

As illustrated in FIG. 5A, microlens array 402 has a configuration in which a plurality of lenses 402a are arranged, in a plan view, in a horizontal direction parallel to the X axis and in a vertical direction parallel to the Y axis; a predetermined number of lenses 402a are arrayed in each horizontal row and a predetermined number of lenses 402a are arrayed in each vertical row. Each of the plurality of lenses 402a has a rectangular shape. More specifically, the plurality of lenses 402a have the same horizontal width Wx and the same vertical width Wy. Each of widths Wx and Wy may be several tens of micrometers. Although width Wx and width Wy are set to the same value in the example of FIG. 5A, width Wx and width Wy may be set differently.

Each of the plurality of lenses 402a has radius of curvature Rx along the X axis and radius of curvature Ry along the Y axis that are different from each other. In this case, radius of curvature Rx is set to be smaller than radius of curvature Ry; for example, the ratio of Rx:Ry may be set to 1:2. Thus, each of the plurality of lenses 402a is set such that the curvature along the X axis is larger than the curvature along the Y axis. By setting the curvatures of the plurality of lenses 402a in this manner, the laser light beams that have passed through lenses 402a can be led efficiently to the horizontally long region (eye box region) in the vicinity of eyes 2a of driver 2. The curvatures of each lens 402a may be determined depending on the shape of the eye box region as appropriate.

Figure 5B:
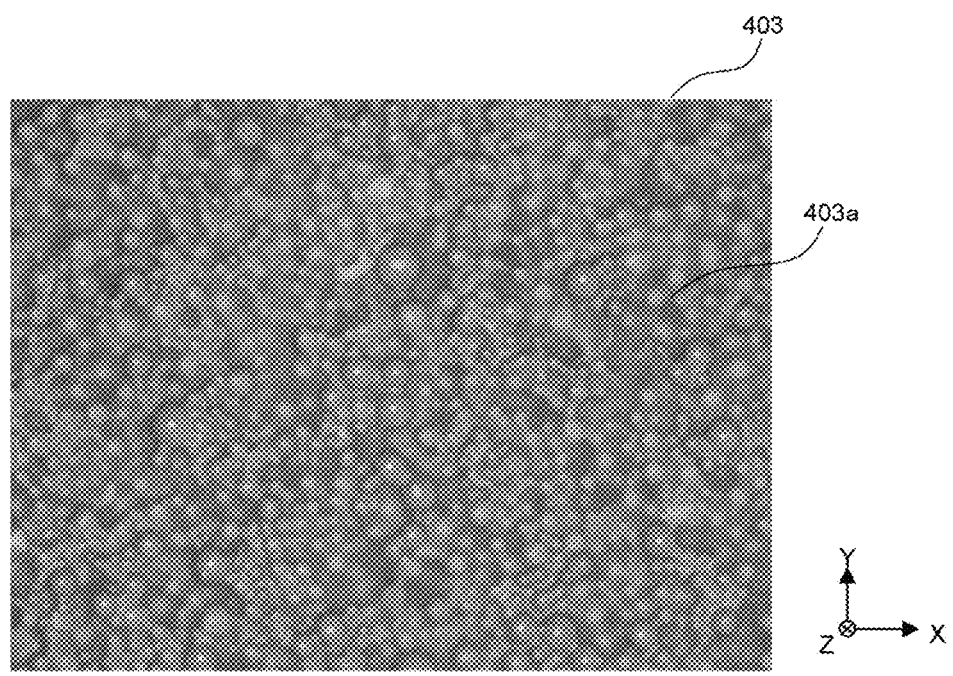
FIG. 5B is a picture image of a bead aggregation in the first exemplary embodiment.

FIG. 5B is a picture image of a part of bead aggregation 403 at the negative side with respect to the Z axis.

As illustrated in FIG. 5B, bead aggregation 403 has a configuration in which the plurality of beads 403a are laid out with no or little space therebetween in a plan view. Each of the plurality of beads 403a is formed of a spherical particle. The plurality of beads 403a preferably have different particle diameters. This is because if their particle diameters are the same as one another, the plurality of beads 403a tend to be disposed regularly in bead aggregation 403. In this case, some of the laser light beams may pass through beads 403a directly, thereby creating some bright spots in image 30. If the plurality of beads 403a have different particle diameters, the plurality of beads 403a tend to be disposed irregularly, as illustrated in FIG. 5B. In this case, the laser light beams are expected to pass through beads 403a with their propagations being hindered by beads 403a, thereby making it possible to suppress bright spots from being created in image 30.

Figure 4B:
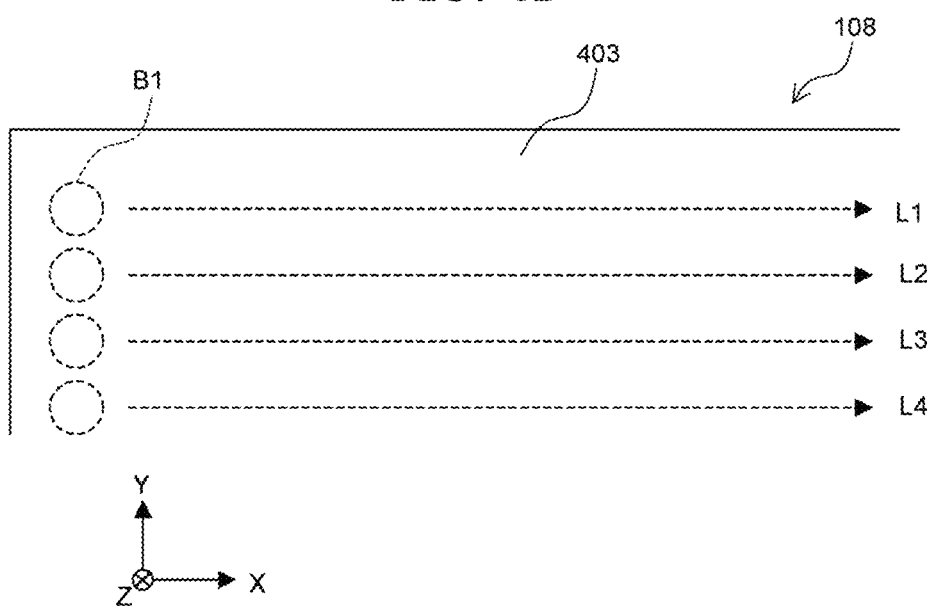
FIG. 4B is a diagram schematically illustrating a method for scanning the screen with a laser light beam.

FIG. 4B schematically illustrates a method for scanning screen 108 with a laser light beam.

The surface of screen 108 configured as above in which bead aggregation 403 is formed is scanned with beam B1 in the positive direction with respect to the X axis; beam B1 is created by overlying the laser light beams of the predetermined colors on one another. Scanning lines L1 to Ln, each of which is a travel path of beam B1, are set in advance on the surface of screen 108 configured as above in which bead aggregation 403 is formed; scanning lines L1 to Ln are formed along the Y axis at regular intervals. The start locations of scanning lines L1 to Ln are aligned with one another in a direction with respect to the X axis; the end locations of scanning lines L1 to Ln are also aligned with one another in a direction with respect to the X axis. The surrounding region of scanning lines L1 to Ln is formed into a rectangular shape, accordingly. The spot diameter of beam B1 may be set to approximately 100 μm, for example.

Beam B1 is composed of the laser light beams of the predetermined colors modulated with a video signal. Beam B1 moves along scanning lines L1 to Ln at a high frequency, creating an image. The resultant image is projected onto the eye box region in the vicinity of eyes 2a of driver 2 via screen 108, mirror 22, and windshield 12 (see FIG. 1C). This enables driver 2 to visually perceive image 30 within a space in front of windshield 12 as a virtual image.

Figure 6A:
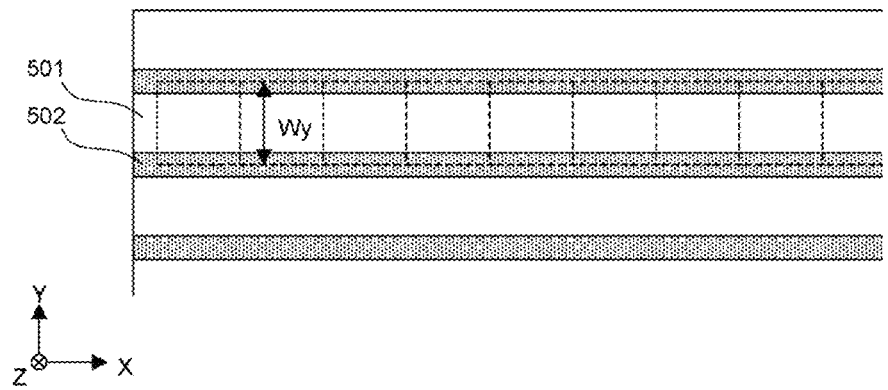
FIG. 6A is a plan view illustrating a part of a mask viewed form a front face side in the first exemplary embodiment.
Figure 6B:
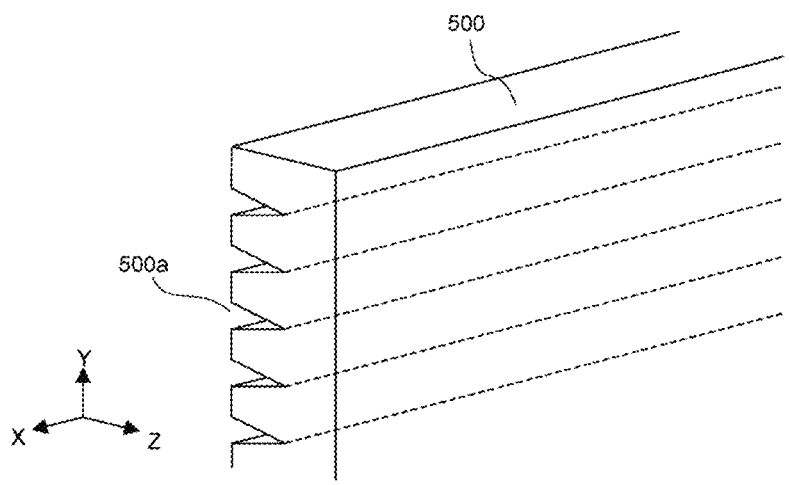
FIG. 6B is a perspective view illustrating a part of the mask viewed from a rear face side in the first exemplary embodiment in which canopies have not yet been formed.
Figure 6C:
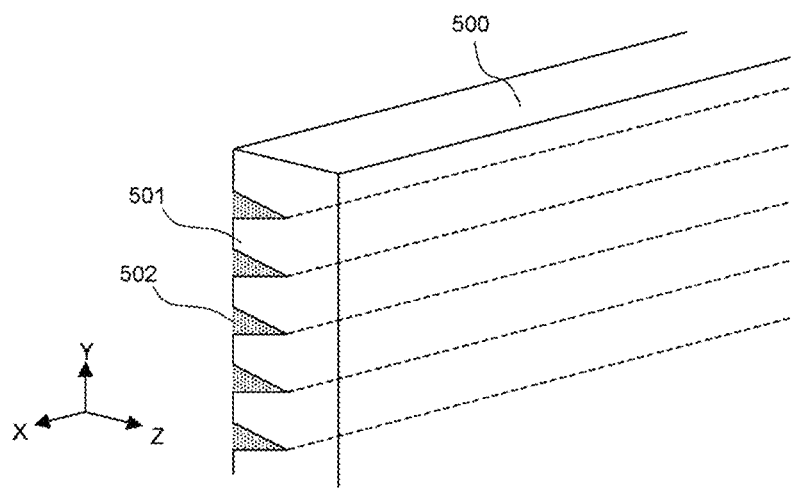
FIG. 6C is a perspective view illustrating the part of the mask viewed from a rear face side in the first exemplary embodiment in which the canopies have been formed.

FIG. 6A is a plan view illustrating a part of mask 500 viewed from a front face side (on the negative side with respect to the Z axis). FIG. 6B is a perspective view illustrating a part of mask 500 in which canopies 502 have not yet been formed viewed from a rear face side (on the positive side with respect to the Z axis). FIG. 6C is a perspective view illustrating the part of mask 500 in which canopies 502 have been formed viewed from a rear face side (on the positive side with respect to the Z axis). For the sake of convenience, in FIG. 6A, lenses 402a of microlens array 402 arranged on the uppermost line are drawn by the broken line.

As illustrated in FIG. 6B, on the light incident surface (the negative side with respect to the Z axis) of mask 500 with canopies 502 not formed yet, a plurality of grooves 500a are formed at regular intervals along the Y axis so as to extend along the X axis. Each groove 500a extends from the positive side edge of mask 500 with respect to the X axis to negative side edge of mask 500 with respect to the X axis. The cross section of each groove 500a taken along the Y-Z plane has the shape of an isosceles triangle. Mask 500 may be made of a transparent resin material, such as PET. Alternatively, mask 500 may be made of another transparent material, such as glass.

As illustrated in FIG. 6C, each groove 500a is filled with a black coloring material that absorbs light, forming canopy 502. The cross section of each canopy 502 has the shape of an isosceles triangle, similar to grooves 500a. Opening portion 501, which has a horizontally long shape and transmits light, is formed between two adjacent canopies 502 along the Y axis. When light enters opening portions 501 from the negative side with respect to the Z axis, the light passes through opening portions 501 and then emit from opening portions 501 at the positive sides with respect to the Z axis. When light enters canopies 502 from the negative side with respect to the Z axis, the light is absorbed by canopies 502.

As illustrated in FIG. 6A, opening portions 501, each of which has a horizontally long rectangular shape in a plan view, are disposed in a vertical direction at regular intervals in mask 500 configured as above. The horizontal length of each opening portion 501 is set to be greater than the total horizontal width of lenses 402a arrayed in a horizontal direction. Thus, each opening portion 501 covers the area of the group of lenses 402a arrayed in a horizontal direction.

The vertical length of each opening portion 501 is set to be smaller than width Wy of each of the plurality of lenses 402a. Furthermore, the vertical length of opening portions 501 is set such that laser light beams that have passed through opening portions 501 are not diffracted. For example, the laser light beams in the above wavelength bands emitted from laser light sources 101a, 101b, 101c may be diffracted when the vertical length of opening portions 501 is equal to or less than 10 µm. For this reason, it is necessary to set the vertical length of opening portions 501 to 10 µm or more. In this case, canopies 502 and opening portions 501 may be equal in length along the X axis.

Figure 7:
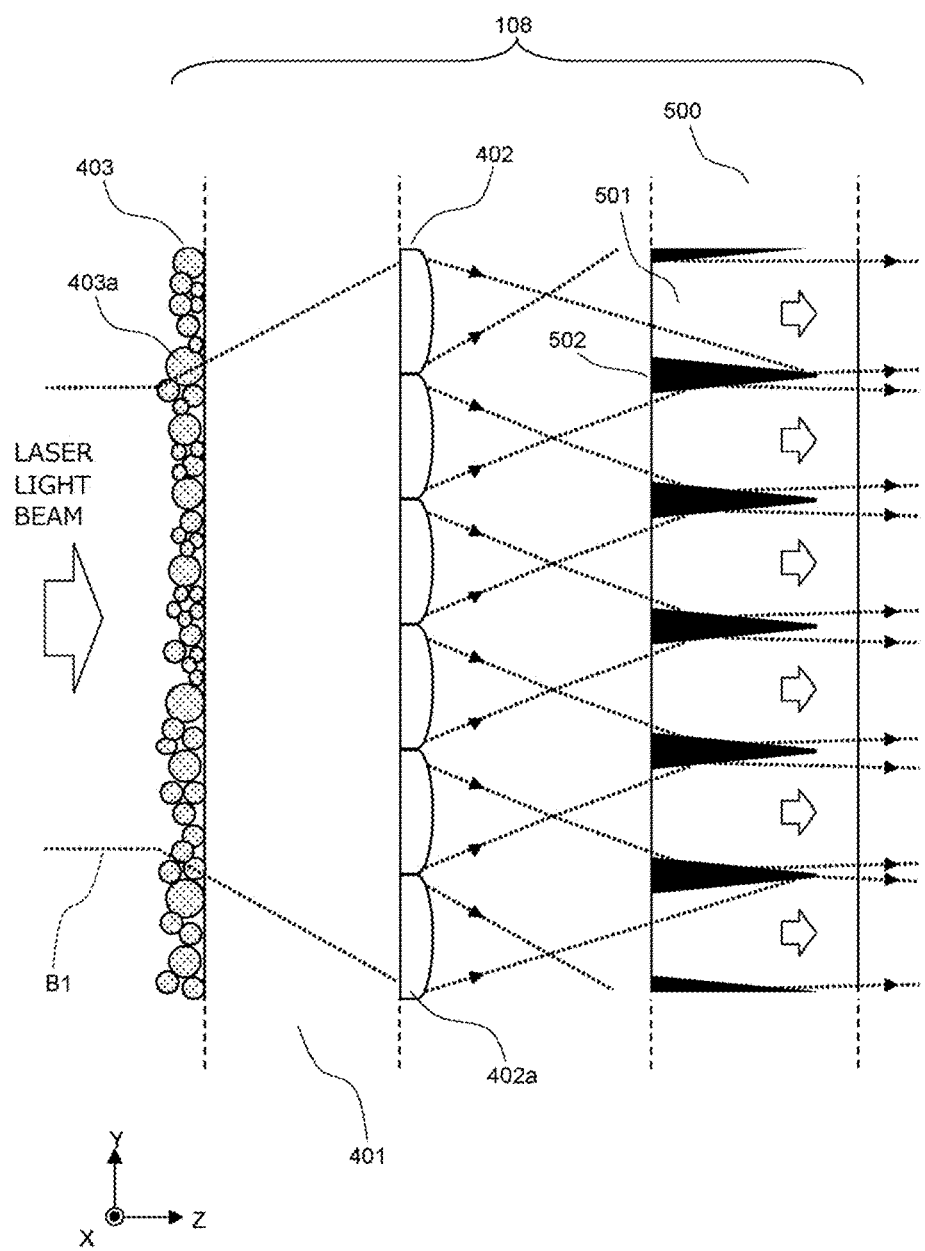
FIG. 7 is a diagram schematically illustrating a function of the screen in the first exemplary embodiment.

FIG. 7 schematically illustrates a function of screen 108.

When a laser light beam (beam B1 in FIG. 4B) enters screen 108, the laser light beam is scattered by bead aggregation 403 and then incident on microlens array 402. The laser light beam that has been scattered by bead aggregation 403 and incident on the plurality of lenses 402a in microlens array 402 is subjected to an optical action produced by lenses 402a. More specifically, the laser light beam undergoes an action of convergence of lenses 402a so that the laser light beam will pass through screen 108 and reach the eye box region in the vicinity of eyes 2a of driver 2. The action of convergence of each lens 402a is set in conjunction with the optical actions of mirror 22 and windshield 12 (see FIG. 1C).

The laser light beam that has passed through microlens array 402 is output from mask 500 through opening portions 501 and reaches mirror 22. Major part of the laser light beam that has passed through opening portions 501 reaches mirror 22 without entering canopies 502. However, some of the laser light beam that has passed through opening portions 501 enters canopies 502 as illustrated in FIG. 7 and is subjected to the optical action produced by canopies 502. More specifically, a part of the laser light beam which has entered canopies 502 at small angles of incidence are reflected by the interfaces between grooves 500a (see FIG. 6B) and canopies 502 and then reach mirror 22. A part of the laser light beam which has entered canopies 502 at large angles of incidence pass through the interfaces between grooves 500a (see FIG. 6B) and canopies 502 and then are absorbed by canopies 502.

As described above, canopies 502 remove a part of the laser light beam for image display which has passed through microlens array 402. On the other hand, when external light such as natural light or stray light travels, in the reverse direction, along the optical path formed by screen 108, mirror 22, and windshield 12 and then enters screen 108, canopies 502 block this external light from entering bead aggregation 403.

If mask 500 is not provided, for example, when external stray light enters screen 108 in the above manner, the stray light passes through microlens array 402 and then is incident on bead aggregation 403. When the stray light enters bead aggregation 403 made up of beads 403a having different particle diameters, a part of the stray light is reflected by beads 403a of bead aggregation 403 and returned to microlens array 402. The part of the stray light passes through microlens array 402 and then reach mirror 22. As a result, driver 2 may visually perceive an image in which a whitish and blurry image created by the stray light is superimposed on an image created based on a video signal. In other words, driver 2 may see an unnatural image with a whitish and blurry area within a landscape in front of windshield 12. Consequently, driver 2 might feel something wrong with this image.

If mask 500 is disposed on microlens array 402 at the positive side with respect to the Z axis as in this exemplary embodiment, external stray light is blocked by canopies 502 of mask 500. This can prevent a whitish and blurry image created by stray light from being superimposed on an image created based on a video signal, thereby providing driver 2 with a natural image.

It can be said that each canopy 502 preferably has a great height along the Z axis, in terms of a capacity to block stray light. However, if the height of each canopy 502 increases, a laser light beam based on a video signal which has passed through microlens array 402 is blocked by canopies 502 in a large amount. Consequently, image 30 with lower brightness may be provided to driver 2. Therefore, it is necessary to appropriately determine a height of canopies 502 in consideration of the tradeoff between control of stray light that may be superimposed onto image 30 and brightness of image 30. If the cross section of each canopy 502 has the shape of isosceles triangle as illustrated in FIG. 6C, for example, a height of canopies 502 is preferably set to three times to five times inclusive the width of opening portion 501 along the Y axis.

The reason why the shape of the cross section of each canopy 502 in this exemplary embodiment is an isosceles triangle will be described below.

To fabricate canopies 502 precisely with their mechanical strength maintained, each canopy 502 has a bottom of a predetermined width or more. If each canopy 502 extends in the positive direction with respect to the Z axis with its width maintained evenly from the bottom to the tip, a larger percentage of a laser light beam based on a video signal which has passed through lenses 402a enters canopies 502. Thus, image 30 with lower brightness may be provided to driver 2. In contrast, if each canopy 502 extends in the positive direction with respect to the Z axis with its width decreased from the bottom to the tip, a smaller percentage of a laser light beam based on a video signal which has passed through lenses 402a enters canopies 502. Thus, image 30 with higher brightness can be provided to driver 2.

As described above, for the purpose of fabricating canopies 502 preciously with their mechanical strength maintained and decreasing a percentage of a laser light beam based on a video signal absorbed by canopies 502, each canopy 502 preferably has a cross section whose width decreases from the bottom to the tip, or a cross section taking the shape of an isosceles triangle.

A shape of the cross section of each canopy 502 is not limited to an isosceles triangle; the cross section may have any other shapes whose width decreases from the bottom to the tip. Alternatively, for example, the cross section of each canopy 502 may have two sides curved or recessed inwardly. The cross section of each canopy 502 may have a trapezoidal shape. If it is possible to fabricate each canopy 502 precisely with its mechanical strength maintained, the cross section may have a rectangular shape with the bottom on the negative side with respect to the Z axis further shortened.

In the above way, mask 500 blocks external stray light from entering screen 108. This can reduce a risk of quality of an image being lowered due to entry of the stray light in bead aggregation 403.

Figure 8A:
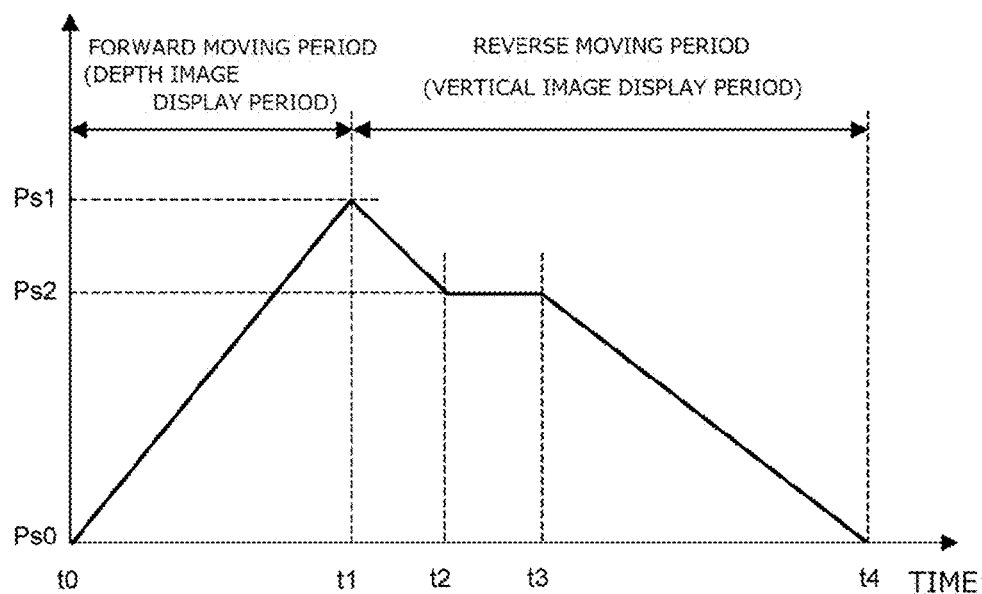
FIG. 8A is a graph with respect to an exemplary step of moving the screen in the first exemplary embodiment.
Figure 8B:
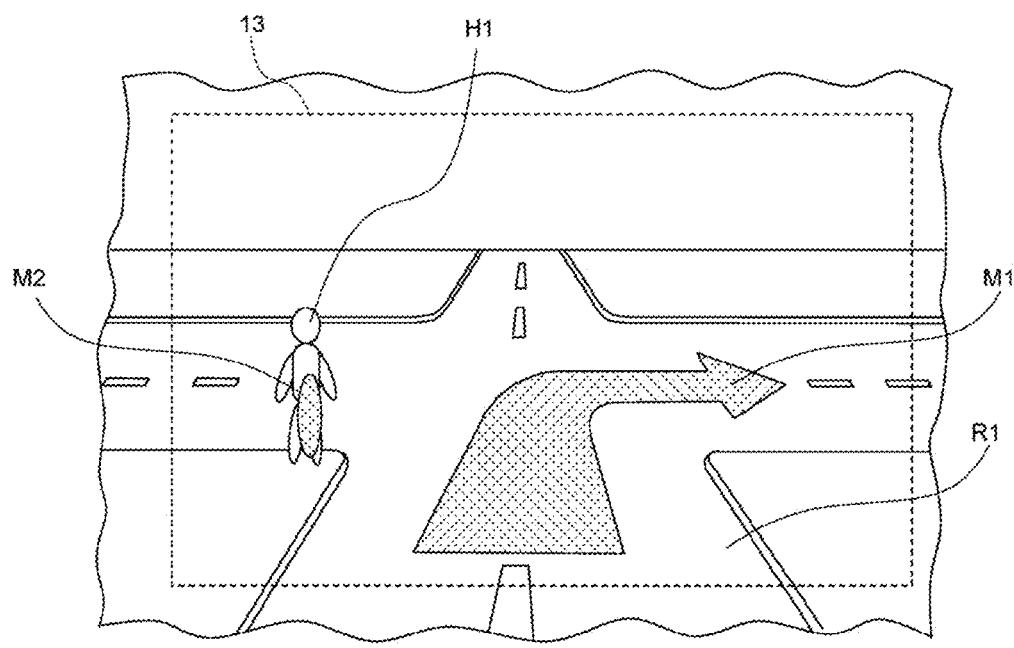
FIG. 8B is an exemplary image shown by moving the screen.

FIG. 8A is a graph with respect to an exemplary step of moving screen 108; FIG. 8B is an exemplary image shown by moving screen 108. At the step of moving screen 108, an image as illustrated in FIG. 8B is displayed on screen 108.

As illustrated in FIG. 8A, screen 108 moves in cycles, each of which starts at time t0 and ends at time t4. Between time t0 and time t1, screen 108 moves from initial location Ps0 to farthest location Ps1. Then, between time t1 and time t4, screen 108 returns from farthest location Ps1 to initial location Ps0. One period over which screen 108 moves, or the period between time t0 and time t4, is may be 1/60 seconds, for example. To move screen 108 in the manner illustrated in FIG. 8A, an electrical signal applied to coil 305 illustrated in FIG. 3B is changed.

During the period between time t0 and time t1, depth image M1, which is an image that has a depth, is displayed as illustrated in FIG. 8B. During the period between time t1 and time t4, vertical image M2, which is an image that spreads out in a vertical direction (an image that has no depth), is displayed as illustrated in FIG. 8B. In the example of FIG. 8B, depth image M1 corresponds to the arrow with which a navigation function proposes in which direction driver 2 needs to turn vehicle 1 on street R1, and vertical image M2 corresponds to the mark for making driver 2 pay attention to pedestrian H1. For example, depth image M1 and vertical image M2 may be displayed with different colors.

Between time t0 and time t1, screen 108 moves in a linear manner from initial location Ps0 to farthest location Ps1. In response to the movement of screen 108, a site at which the virtual image is created in front of windshield 12 is shifted in the depth direction. Therefore, when screen 108 is present at each site in the depth direction within depth image M1, laser light sources 101a, 101b, 101c emit light to scanning lines corresponding to depth image M1 at a timing corresponding to depth image M1. This makes it possible to display, as a virtual image, depth image M1 illustrated in FIG. 8B in front of projection area 13 of windshield 12.

Since vertical image M2 does not change in the depth direction and is spread out only in a vertical direction, it is necessary to fix screen 108 at a location corresponding to vertical image M2 and generate a virtual image. Stop location Ps2 in FIG. 8A is a location of screen 108 corresponding to a depth site of vertical image M2. When returning from farthest location Ps1 to initial location Ps0, screen 108 stops at stop location Ps2 between time t2 and time t3. Meanwhile, laser light sources 101a, 101b, 101c emit light to scanning lines corresponding to vertical image M2 at a timing corresponding to vertical image M2. This makes it possible to display, as a virtual image, vertical image M2 illustrated in FIG. 8B in front of projection area 13 of windshield 12.

The above control is performed by image processing circuit 201 illustrated in FIG. 2. This control causes depth image M1 and vertical image M2 to be displayed as virtual images between time t0 and time t4. Under the control, depth image M1 and vertical image M2 may be displayed at different timings. However, since the difference between the display timings is sufficiently small, driver 2 can visually perceive an image in which depth image M1 and vertical image M2 overlap each other. Consequently, it is possible for driver 2 to see images based on a video signal (depth image M1 and vertical image M2) in front of projection area 13 while these images are overlapping a landscape containing street R1 and pedestrian H1.

Since single vertical image M2 is displayed in FIG. 8B, single stop location Ps2 is set for screen 108 at the step in FIG. 8A. However, if a plurality of vertical images M2 are displayed, a plurality of stop locations may be set at the step in FIG. 8A. In this case, it should be noted that time t4 is fixed and the period between time t0 and time t4 is constant at the step of FIG. 8A. Therefore, a moving speed of screen 108 (the gradient of the waveform in FIG. 8A) needs to be set depending on the number of stop locations.

Next, a description will be given of a circuit configuration of screen drive circuit 204.

Figure 9A:
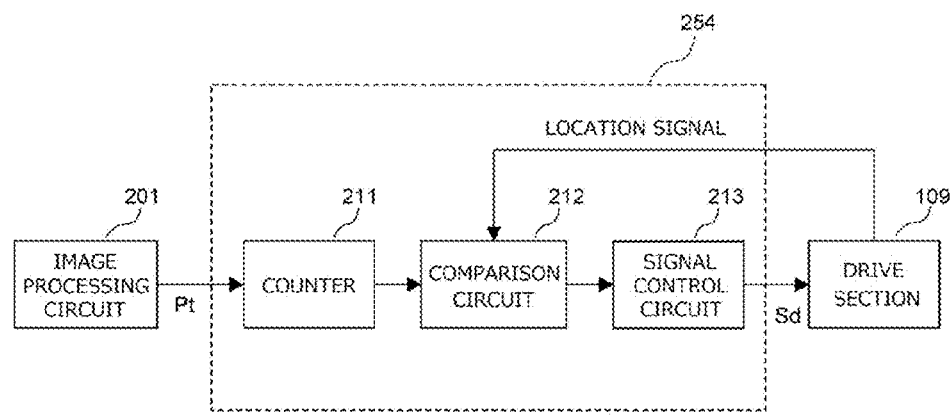
FIG. 9A is a block diagram illustrating a configuration of a screen drive circuit in Comparative Example.

FIG. 9A illustrates a circuit configuration of screen drive circuit 254 in Comparative Example.

Screen drive circuit 254 in Comparative Example includes counter 211, comparison circuit 212, and signal control circuit 213. Image processing circuit 201 enters pulse signal Pt in counter 211; the number of pulses in pulse signal Pt is associated with a location to which screen 108 will move. Comparison circuit 212 compares a signal (representative of a target location of screen 108) received from counter 211 with a signal (representative of a current location of screen 108) received from the encoder in drive section 109. Then, comparison circuit 212 outputs a signal representative of the difference between both signals to signal control circuit 213. Signal control circuit 213 adjusts drive signal Sd to be applied to coil 305 in drive section 109, based on the signal received from comparison circuit 212 so that a location of drive section 109 converges to a location corresponding to a count value of counter 211. In this way, screen 108 moves while sequentially heading for locations designated by image processing circuit 201.

Image processing circuit 201 outputs pulse signal Pt to counter 211 in order to move screen 108, for example in accordance with the waveform illustrated in FIG. 8A. In this case, screen drive circuit 254 in Comparative Example controls screen 108 to move between time t1 and t2, quickly stop screen 108 at time t2, and keeps screen 108 in the stopped state until time t3 comes.

However, when screen 108 attempts to stop at stop location Ps2, screen 108 passes over stop location Ps2. Thus, under the above control, drive section 109 that drives screen 108 returns screen 108 that has passed over stop location Ps2 to stop location Ps2 in accordance with drive signal Sd. As a result, a location of screen 108 gradually converges to stop location Ps2. Therefore, this control may vibrate screen 108 in the vicinity of stop location Ps2 from time t2 until screen 108 has completely stopped at stop location Ps2. This vibration might lower the quality of vertical image M2, which is an image that has no depth (see FIG. 8B). Concretely, a risk of blurring the contour of vertical image M2 and lowering its visibility arises. To suppress the lowering of the image quality, it is necessary to sufficiently damp the vibration of screen 108 within a short period of time However, if screen 108 is elastically supported by plate springs 304 as illustrated in FIG. 3A, there are cases where screen 108 produces resonance, thus continuing to greatly oscillate with its location not converging to the stop location. In this case, it may be no longer possible to appropriately display vertical image M2, which is an image that has no depth.

Figure 9B:
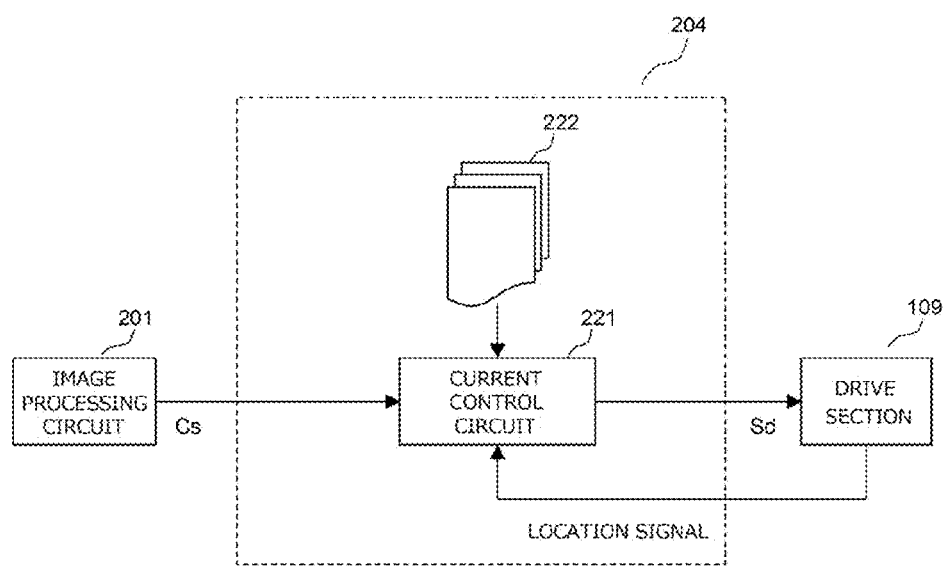
FIG. 9B is a block diagram illustrating a configuration of a screen drive circuit in the first exemplary embodiment.

To address the above problem, screen drive circuit 204 in this exemplary embodiment is provided with the configuration illustrated in FIG. 9B.

As illustrated in FIG. 9B, screen drive circuit 204 includes current control circuit 221 and drive signal table 222; current control circuit 221 has a waveform generator and a current amplifier. Drive signal table 222 stores an information group for use in generating drive signals that cause screen 108 to reciprocate over predetermined periods. Multiple pieces of information stored in drive signal table 222 are used to generate drive signals that cause screen 108 to stop at various stop locations within various stop periods; these stop locations are confined in the reciprocation range of screen 108. When receiving control signal Cs from image processing circuit 201, current control circuit 221 selects information associated with an image to be displayed from among the information group in drive signal table 222 in accordance with the control signal Cs. Then, current control circuit 221 generates a drive signal, based on the selected information and supplies this drive signal to drive section 109.

In the configuration of FIG. 9B, more specifically, image processing circuit 201, at first, identifies which information stored in drive signal table 222 is the most suitable for an image to be displayed. Image processing circuit 201 stores a selection table for use in identifying information suitable for an image to be displayed. Image processing circuit 201 identifies which information is the most suitable for an image to be displayed, based on this selection table. Then, image processing circuit 201 generates control signal Cs that designates the information identified in the above manner and outputs control signal Cs to current control circuit 221. When receiving control signal Cs, current control circuit 221 selects the designated information in drive signal table 222. Then, current control circuit 221 generates and amplifies a drive signal, based on the selected information and supplies drive section 109 with the generated drive signal as a current signal. As a result, screen 108 reciprocates in a suitable manner for an image to be displayed.

FIG. 10A is a configuration of the selection table stored in image processing circuit 201; FIG. 10B is a configuration of drive signal table 222 stored in screen drive circuit 204.

Referring to FIG. 10A, in the selection table stored in image processing circuit 201, stop patterns are each defined by the number of times that screen 108 stops during a reverse moving route (the route from farthest location Ps1 to initial location Ps0) and their stop locations and stop periods. In addition, the selection table stores drive signal numbers in relation to the respective stop patterns; each of the drive signal numbers is used to determine which drive signal is to be applied to a corresponding stop pattern.

The stop locations are set by, for example finely dividing the range between initial location Ps0 and farthest location Ps1 illustrated in FIG. 8. The stop periods are set in stages as periods over which vertical image M2 is to be displayed; these periods are confined within the period for the reverse moving route illustrated in FIG. 8A. The drive signals used to stop screen 108 in accordance with the stop patterns are preset through a simulation.

Referring to FIG. 10B, in this exemplary embodiment, generation information for use in generating the drive signals that have been preset through a simulation is stored in drive signal table 222 of screen drive circuit 204 in relation to drive signal numbers. The generation information may be parameter values for use in identifying the waveform of a drive signal. In this case, current control circuit 221 generates the drive signals, based on the parameter values. Information stored in drive signal table 222 is not limited to the generation information; alternatively, any other information that enables drive signals to be generated may be stored. That is to say, the generation information in FIG. 10B stored in drive signal table 222 of screen drive circuit 204 is linked, by the drive signal numbers, to the stop patterns (the number of stops, stop locations, and stop periods) in FIG. 10A defined in the selection table of image processing circuit 201.

Drive signal table 222 in FIG. 10B also stores generation information regarding a drive signal that does not cause screen 108 to stop on the reverse moving route. When screen 108 moves along the reverse moving route monotonously without stopping at any midway location, screen drive circuit 204 generates the drive signal, based on this generation information.

Figure 11A:
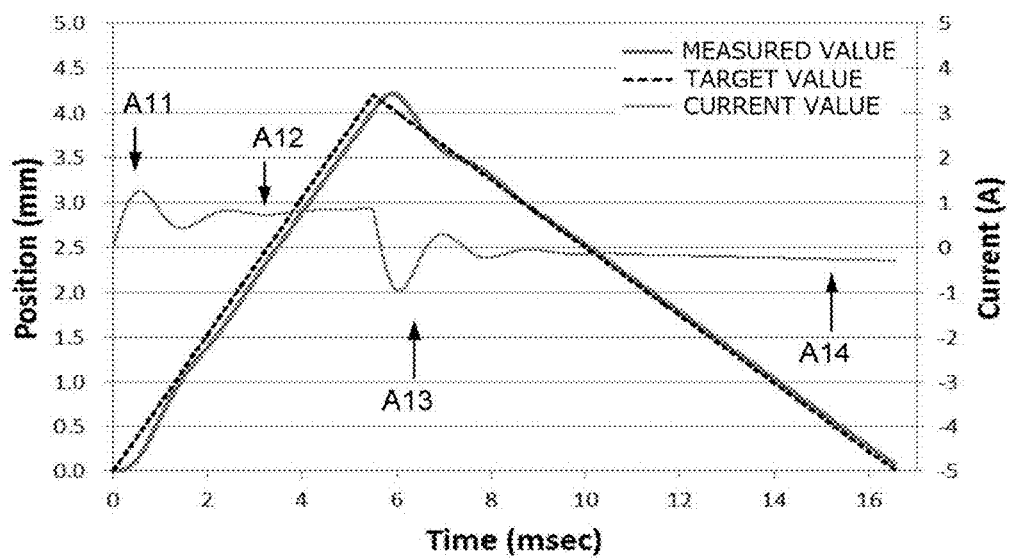
FIG. 11A is a graph showing: the waveform of a periodic signal supplied to the drive section when the screen reciprocates monotonously; and a state of the screen driven with the periodic signal in the first exemplary embodiment.

FIG. 11A illustrates a simulation result for the case where screen 108 reciprocates monotonously, which shows the waveform of a drive signal supplied to drive section 109 for screen 108 and a location of screen 108 driven to move in accordance with the drive signal.

In FIG. 11A, the term "current value" refers to a drive signal supplied to coil 305 in drive section 109. In FIG. 11A, the term "target value" refers to a target location for moving screen 108. The term "measured value" refers to an actual location at which screen 108 is moving when the drive signal corresponding to the "current value" is supplied to coil 305 in drive section 109. The horizontal axis represents a time; the left vertical axis represents a location of screen 108; and the right vertical axis represents a current value.

When screen 108 does not stop on the reverse moving route, current control circuit 221 generates a drive signal (current value) corresponding to the current value in FIG. 11A, based on the generation information acquired from drive signal table 222. Then, current control circuit 221 applies the generated drive signal (current value) to coil 305 included in drive section 109. As a result, as illustrated in FIG. 11A, screen 108 moves while sequentially heading for the locations corresponding to the target values and passing over surrounding regions of these locations.

In the drive pattern of FIG. 11A, screen 108 starts moving along a forward moving route (the route from initial location Ps0 to farthest location Ps1) in response to waveform signal A11 having a positive amplitude and then moves at a constant speed in response to waveform signal A12 having a positive amplitude. Subsequently, screen 108 changes its moving route from the forward moving route to the reverse moving route in response to waveform signal A13 having a negative amplitude and then moves at a constant speed in response to waveform signal A14 having a negative amplitude.

Figure 11B:
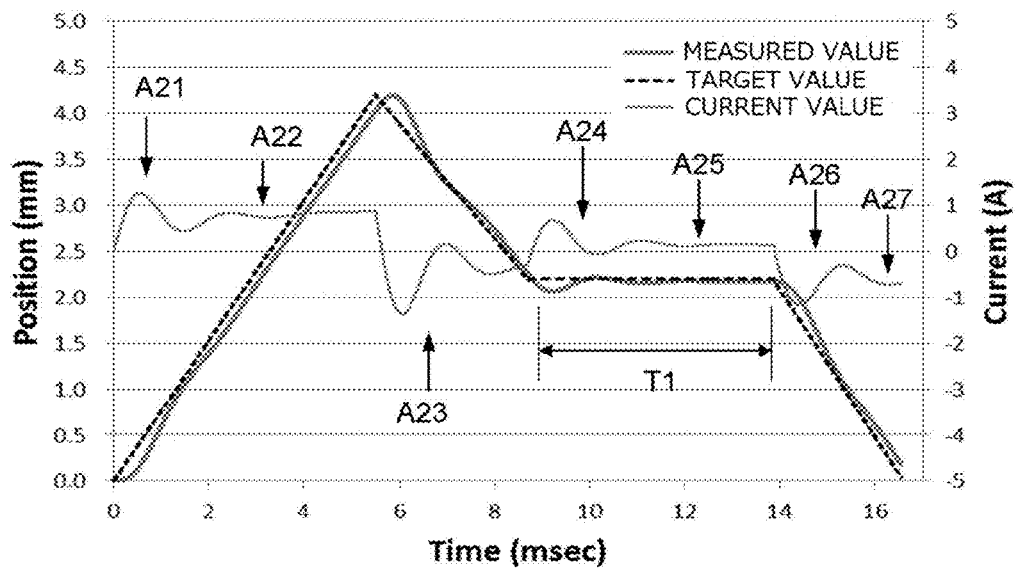
FIG. 11B is a graph showing: the waveform of a periodic signal supplied to the drive section when the screen stops at a single location; and a state of the screen driven with the periodic signal in the first exemplary embodiment.

FIG. 11B illustrates a simulation result for the case where screen 108 stops at a single location on the reverse moving route, which shows the waveform of a drive signal supplied to drive section 109 and a location of screen 108 driven to move in accordance with the drive signal.

When screen 108 stops at a single location on the reverse moving route, current control circuit 221 generates a drive signal (current value) corresponding to the current value in FIG. 11B, based on the generation information acquired from drive signal table 222. Then, current control circuit 221 applies the generated drive signal (current value) to coil 305 included in drive section 109. As a result, as illustrated in FIG. 11B, screen 108 moves while sequentially heading for the locations corresponding to the target values and passing over surrounding regions of these locations and, on the way, temporarily stops at the predetermined location.

In the drive pattern of FIG. 11B, screen 108 starts moving along the forward moving route in response to waveform signal A21 having a positive amplitude and then moves at a constant speed in response to waveform signal A22 having a positive amplitude. Subsequently, screen 108 changes its moving route from the forward moving route to the reverse moving route in response to waveform signal A23 having a negative amplitude and then moves at a constant speed. Then, positive waveform signal A24 applies a braking force to screen 108, and then screen 108 stops in response to waveform signal A25. Screen 108 stops moving over period T1. After that, screen 108 resumes moving along the reverse moving route in response to waveform signal A26 having a negative amplitude and then moves at a constant speed in response to waveform signal A27 having a negative amplitude.

Figure 11C:
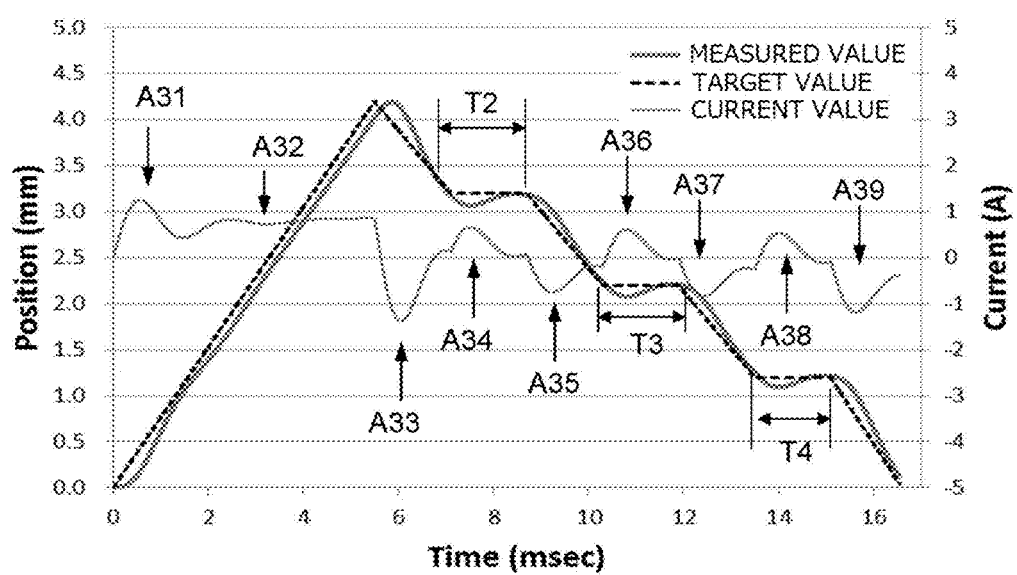
FIG. 11C is a graph showing: the waveform of a periodic signal supplied to the drive section when the screen stops at three locations; and a state of the screen driven with the periodic signal in the first exemplary embodiment.

FIG. 11C illustrates a simulation result for the case where screen 108 stops at three locations on the reverse moving route, which shows the waveform of a drive signal supplied to drive section 109 and a location of screen 108 driven to move in accordance with the drive signal.

When screen 108 stops at three locations on the reverse moving route, current control circuit 221 generates a drive signal (current value) corresponding to the current value in FIG. 11C, based on the generation information acquired from drive signal table 222. Then, current control circuit 221 applies the generated drive signal (current value) to coil 305 included in drive section 109. As a result, as illustrated in FIG. 11C, screen 108 moves while sequentially heading for the locations corresponding to the target values and passing over surrounding regions of these locations and, on the way, temporarily stops at the three locations.

Referring to FIG. 11C, similarly to FIG. 11B, screen 108 starts moving along the forward moving route in response to waveform signal A31 and then moves at a constant speed in response to waveform signal A32. Subsequently, screen 108 changes its moving route from the forward moving route to the reverse moving route in response to waveform signal A33. After that, screen 108 stops moving over period T2 in response to positive waveform signal A34, and then resumes moving along the reverse moving route in response to waveform signal A35. Continuing, screen 108 stops moving over period T3 in response to positive waveform signal A36, and then resumes moving along the reverse moving route in response to waveform signal A37. Likewise, screen 108 stops moving over period T4 in response to positive waveform signal A38, and then resumes moving along the reverse moving route in response to waveform signal A39.

In the example of FIG. 11B, the stop pattern of screen 108 includes a single stop location and stop period T1; in the example of FIG. 11C, the stop pattern includes three stop locations and stop periods T2 to T4. However, drive signal table 222 in screen drive circuit 204 may store generation information applicable to not only the stop patterns in FIG. 11B and FIG. 11C but also other various stop patterns.

The drive signal applied to coil 305 in drive section 109 is preferably a current signal, and therefore the amplifier is preferably a current amplifier circuit. One reason is that if a voltage amplifier circuit is used, the property of the coil may be varied due to temperature change and a variation in a resistance caused by this temperature change. Thus, a phase of the waveform of a drive signal might change, causing an actual movement of the screen to greatly differ from a movement based on the drive signal table.

Image processing circuit 201 identifies which stop pattern is the most suitable for vertical images M2 contained in an image to be displayed, based on the number of vertical images M2, displayed locations of vertical images M2, and displayed periods for vertical images M2. Then, image processing circuit 201 extracts the drive signal number related to the identified stop pattern from the selection table in FIG. 10A. Image processing circuit 201 outputs the drive signal number extracted in the above manner to current control circuit 221 together with control signal Cs. In response, current control circuit 221 extracts generation information related to the received drive signal number from drive signal table 222 in FIG. 10B and then generates a drive signal, based on the extracted generation information. Current control circuit 221 applies the drive signal generated in this manner to coil 305 in drive section 109. This causes screen 108 to reciprocate in a suitable manner for an image to be displayed.

In this exemplary embodiment, screen drive circuit 204 selects a piece of generation information most suitable for an image to be displayed from among pieces of generation information contained in drive signal table 222. Then, screen drive circuit 204 generates a drive signal, based on the selected generation information and supplies the drive signal to drive section 109. In this way, screen drive circuit 204 can suppress screen 108 from excessively vibrating in the vicinity of one or more stop locations, thus smoothly positioning screen 108 at these stop locations, as opposed to Comparative Example. Therefore, even if screen 108 is elastically supported by plate spring 304 as illustrated in FIG. 3A, there is a low risk of screen 108 producing resonance upon stopping and greatly oscillating in the vicinity of stop locations. Consequently, it is possible to appropriately display vertical image M2, which is an image that has no depth, over a stop period of screen 108.

In this exemplary embodiment, screen drive circuit 204 generates a drive signal without feedback about an actual location at which screen 108 has moved during one period of a drive signal. Therefore, there are cases where the last stop location of screen 108 on the forward moving route or on the reverse moving route is shifted from a normal location due to disturbance, for example. If the last stop location of screen 108 on the forward moving route or on the reverse moving route is shifted from a normal location, drive section 109 may fail to drive screen 108 with a normal stroke.

Figure 12A:
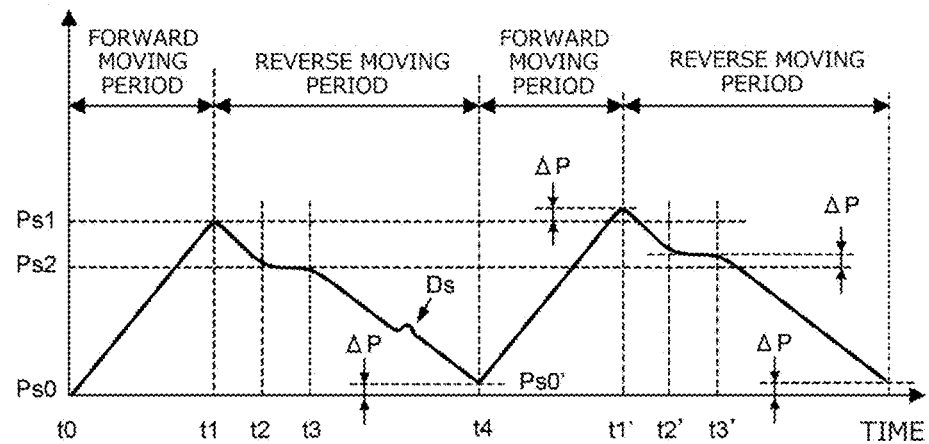
FIG. 12A is a graph showing a driven state of the screen when the last stop location of the screen on a reverse moving route is shifted from a normal location due to disturbance in the first exemplary embodiment.

For example, as illustrated in FIG. 12A, suppose during a first reverse moving period, the last stop location of screen 108 is displaced, by amount ΔP, in a direction from initial location Ps0 to farthest location Ps1 due to disturbance Ds. For the next forward moving period, screen 108 needs to resume moving at location Ps0', which is shifted from normal initial location Ps0 by amount ΔP. Therefore, for this next forward moving period, the last stop location of screen 108 is shifted from normal farthest location Ps1 by amount ΔP. Likewise, for the next reverse moving period, the last stop location of screen 108 is shifted from normal initial location Ps0 by amount ΔP. The stop location is also shifted from normal stop location Ps2 by amount ΔP. These locational shifts are maintained for subsequent periods of the drive signal. This disadvantage may also occur when the last stop location of screen 108 is shifted during the forward moving period due to disturbance.

To address the above disadvantage, drive signal table 222 may store, in advance, generation information regarding a correction drive signal. If the last stop location of screen 108 on the forward moving route is shifted from farthest location Ps1 or if the last stop location of screen 108 on the reverse moving route is shifted from initial location Ps0, this correction drive signal is used to correct the positional shift.

If drive signal table 222 stores generation information regarding a correction drive signal, current control circuit 221 may receive a location signal from the encoder in drive section 109 and monitor both the last stop locations of screen 108 on the forward moving route and on the reverse moving route. If the last stop location of screen 108 on the forward moving route is shifted from normal farthest location Ps1 or if the last stop location of screen 108 on the reverse moving route is shifted from normal initial location Ps0, current control circuit 221 selects the generation information for correcting this positional shift in drive signal table 222. Then, current control circuit 221 generates a drive signal, based on the selected generation information. That is to say, current control circuit 221 determines whether the peak value (indicating the last stop location on the forward moving route) and the bottom value (indicating the last stop location on the reverse moving route) of a location signal acquired from drive section 109 match the corresponding limits of a stroke range of the reciprocation of screen 108 and then adjusts a waveform of a drive signal, based on the determination result.

Figure 12B:
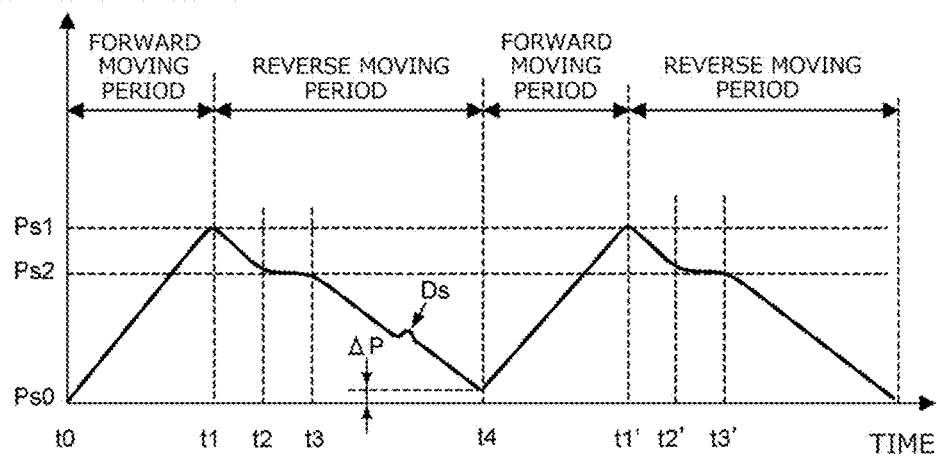
FIG. 12B is a graph showing a correction operation performed when the last stop location of the screen on the reverse moving route is shifted from the normal location due to disturbance in the first exemplary embodiment.

For example, as illustrated in FIG. 12A, suppose the last stop location of screen 108 on the reverse moving route is shifted from normal initial location Ps0 by amount ΔP, due to disturbance Ds. Current control circuit 221 selects generation information in drive signal table 222 regarding a waveform suitable for the shift correction and generates a drive signal for the next period, based on the selected generation information. By generating the drive signal in this manner, as illustrated in FIG. 12B, the last stop location of screen 108 on the forward moving route for the next period coincides with normal farthest location Ps1, and the last stop location of screen 108 on the reverse moving route for the next period coincides with normal initial location Ps0. Furthermore, the stop location of screen 108 also coincides with normal stop location Ps2.

After the positional shift has corrected, current control circuit 221 outputs a signal waveform similar to that in a normal case. Current control circuit 221 continues to monitor location signals output from the encoder in drive section 109. Then, every time detecting that the last stop location of screen 108 on the forward moving route or on the reverse moving route is shifted, current control circuit 221 performs the above correction operation again.

<Effect of First Exemplary Embodiment>

The first exemplary embodiment above produces effects described below.

Current control circuit 221 in image display device 20 selects generation information on a drive signal in drive signal table 222 which is associated with an image to be displayed. Then, current control circuit 221 generates the drive signal based on the selected generation information, and supplies this drive signal to drive section 109. This can reduce a risk that screen 108 excessively vibrates in the vicinity of a stop location. Consequently, it is possible to smoothly stop screen 108 that has moved at a high speed, and to position screen 108 at a stop location without causing any oscillations. Accordingly, vertical image M2, which is an image that has no depth, can be appropriately displayed.

Image display device 20 sets the forward moving period between time t0 and time t1 in FIG. 8A to a period over which screen 108 moves monotonously to display depth image M1. In addition, image display device 20 sets the reverse moving period between time t1 and time t4 in FIG. 8A to a period during which screen 108 timely stops to display vertical image M2. Setting the forward and reverse moving periods in this manner enables both depth image M1 and vertical image M2 to be displayed smoothly through a simple process.

As illustrated in FIG. 8A, image display device 20 sets the reverse moving period during which screen 108 stops to be longer than the forward moving period over which screen 108 does not stop. Therefore, image display device 20 can set a large number of stop periods over which screen 108 stops, within the reverse moving period. Accordingly, vertical image M2 can be effectively disposed within a displayed image.

Second Exemplary Embodiment

A second exemplary embodiment will be described below. It should be noted that configurations substantially the same as those in the first exemplary embodiment will not be described and thus the description will be focused on different configurations. An image display device in the second exemplary embodiment differs from image display device 20 in the first exemplary embodiment in a configuration of screen drive circuit 214. Other configurations of the image display device in the second exemplary embodiment are substantially the same as those of image display device 20 in the first exemplary embodiment.

A circuit configuration of screen drive circuit 214 in this exemplary embodiment will be described with reference to FIG. 13A to FIG. 14C.

Figure 13A:
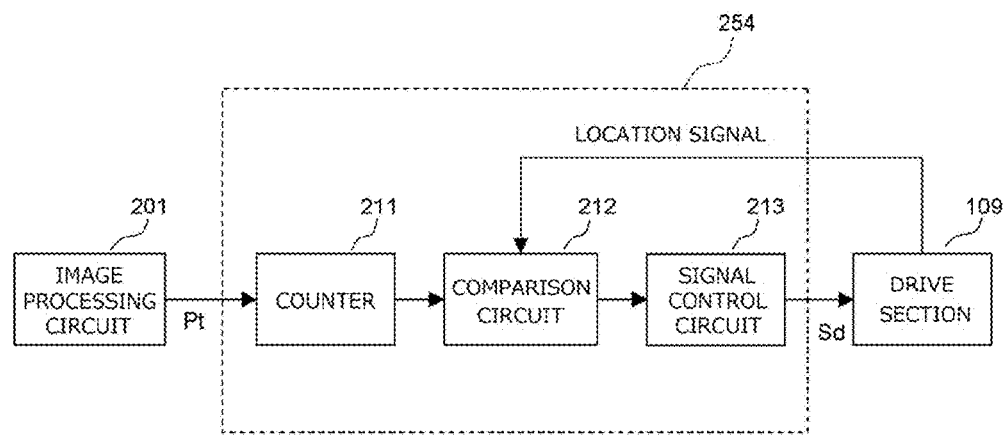
FIG. 13A is a block diagram illustrating a configuration of a screen drive circuit in Comparative Example.

FIG. 13A illustrates a circuit configuration of screen drive circuit 254 in Comparative Example. The configuration of screen drive circuit 254 in Comparative Example is the same as that in Comparative Example for first exemplary embodiment which has been described above. Therefore, the configuration of screen drive circuit 254 in Comparative Example will not be described.

Figure 13B:
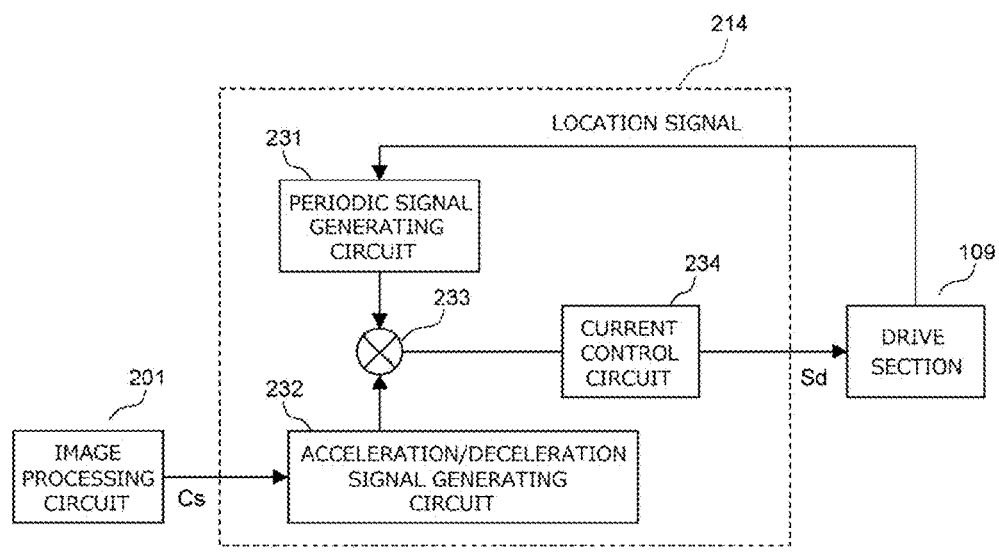
FIG. 13B is a block diagram illustrating a configuration of a screen drive circuit in a second exemplary embodiment.

Screen drive circuit 214 in the second exemplary embodiment has a configuration illustrated in FIG. 13B. More specifically, screen drive circuit 214 in this exemplary embodiment includes periodic signal generating circuit 231, acceleration/deceleration signal generating circuit 232, adder 233, and current control circuit 234. Current control circuit 234 has a waveform generator and a current amplifier. Periodic signal generating circuit 231 outputs a signal for use in causing screen 108 to reciprocate monotonously over a predetermined period. Acceleration/deceleration signal generating circuit 232 outputs a signal for use in stopping screen 108 over a predetermined period and then moving screen 108 again, in accordance with control signal Cs from image processing circuit 201. Adder 233 generates a signal generated by superimposing the signal received from acceleration/deceleration signal generating circuit 232 upon the signal received from periodic signal generating circuit 231. Then Adder 233 supplies this signal to current control circuit 234. Current control circuit 234 changes drive signal Sd in accordance with the signal received from adder 233. Then current control circuit 234 applies drive signal Sd to coil 305 in drive section 109.

Figure 14A:
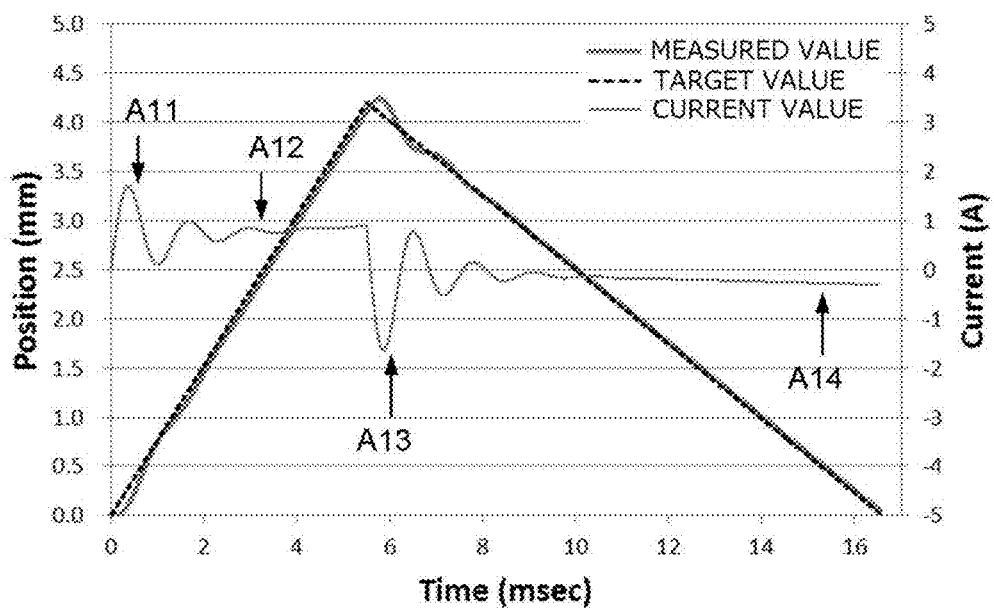
FIG. 14A is a graph showing: the waveform of a periodic signal supplied to a drive section in a screen when the screen reciprocates monotonously; and a state of the screen driven with the periodic signal in the second exemplary embodiment.

FIG. 14A illustrates a simulation result for the case where screen 108 reciprocates monotonously, which shows the waveform of a drive signal (periodic signal) supplied to drive section 109 for screen 108 and a location of screen 108 driven to move in accordance with the drive signal (periodic signal).

In FIG. 14A, the term "current value" refers to a drive signal supplied to coil 305 in drive section 109. In FIG. 14A, the term "target value" refers to a target location for moving screen 108. The term "measured value" refers to an actual location at which screen 108 is moving when the drive signal corresponding to the "current value" is supplied to coil 305 in drive section 109. The horizontal axis represents a time; the left vertical axis represents a location of screen 108; and the right vertical axis represents a current value.

When screen 108 does not stop on the reverse moving route, screen drive circuit 214 applies a drive signal (periodic signal) corresponding to the current value in FIG. 14A to coil 305 in drive section 109. In this case, periodic signal generating circuit 231 in FIG. 13B outputs a signal waveform corresponding to the current value in FIG. 14A, but acceleration/deceleration signal generating circuit 232 in FIG. 13B outputs no signal. By applying this drive signal (current value) to coil 305 in drive section 109, screen 108 can move while sequentially heading for the locations corresponding to the target values and passing over surrounding regions of these locations, as illustrated in FIG. 14A.

In FIG. 14A, screen 108 starts moving along the forward moving route in response to waveform signal A11 having a positive amplitude and then moves at a constant speed in response to waveform signal A12 having a positive amplitude. Subsequently, screen 108 changes its moving route from the forward moving route to the reverse moving route in response to waveform signal A13 having a negative amplitude and then moves at a constant speed in response to waveform signal A14 having a negative amplitude.

Figure 14B:
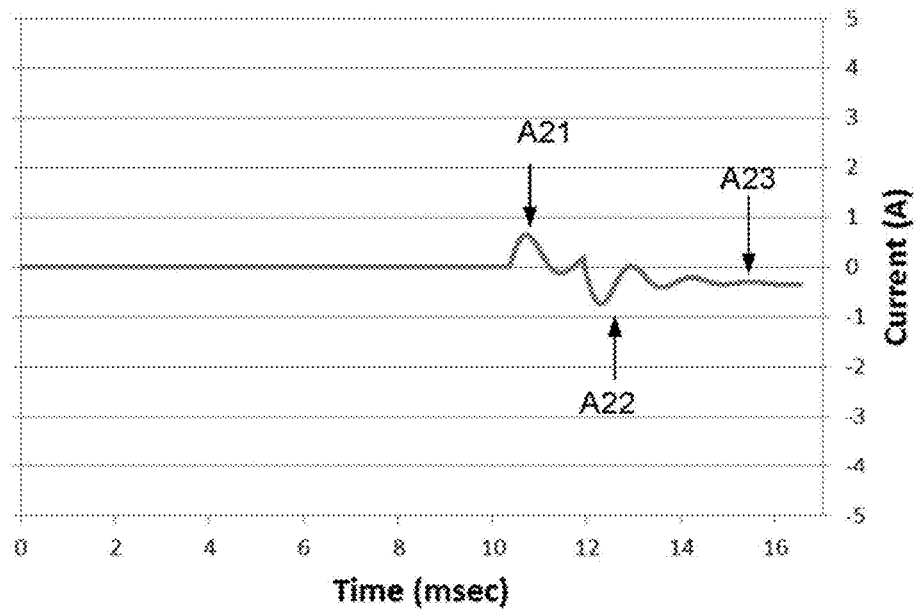
FIG. 14B is a graph showing the waveform of an acceleration/deceleration signal to be superimposed when the screen stops in the second exemplary embodiment.

FIG. 14B illustrates the waveform of a signal (acceleration/deceleration signal) to be superimposed on the drive signal (periodic signal) in FIG. 14A when screen 108 stops for a predetermined period.

The signal illustrated in FIG. 14B is output from current control circuit 234 in FIG. 13B. In this case, acceleration/deceleration signal generating circuit 232 in FIG. 13B outputs a signal waveform that is the same as that in FIG. 14B.

In FIG. 14B, waveform signal A21 having a positive amplitude applies a braking force to screen 108. Then, screen 108 resumes moving along the reverse moving route in response to waveform signal A22 having a negative amplitude. Waveform signal A23 having a negative amplitude, which follows waveform signal A22, applies propulsion to screen 108, so that screen 108 moves along the reverse moving route at an increased speed. In the example of FIG. 14B, screen 108 stops for a short period, and thus waveform signal A22 substantially continues to waveform signal A21. If screen 108 stops for a long period, however, a waveform signal having a positive amplitude may be generated during the period between waveform signal A21 and waveform signal A22 in order to cancel the drive signal (periodic signal) in FIG. 14A during this period.

Figure 14C:
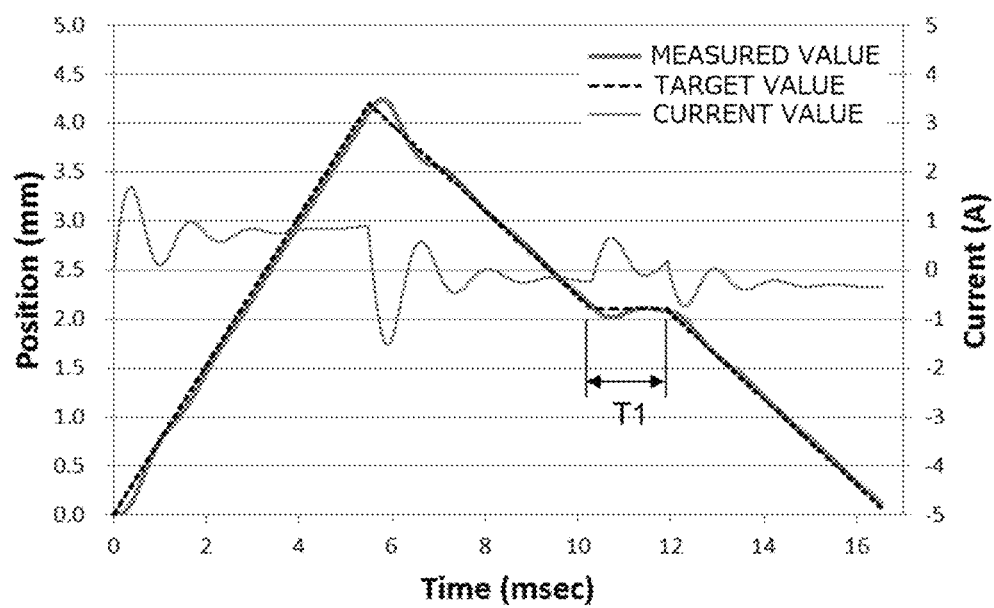
FIG. 14C is a graph showing: the waveform of a drive signal obtained by superimposing the acceleration/deceleration signal in FIG. 14B on the periodic signal in FIG. 14A; and a state of the screen driven with the drive signal.

FIG. 14C illustrates the waveform of a drive signal (current value) generated by superimposing the signal (acceleration/deceleration signal) in FIG. 14B upon drive signal (periodic signal) in FIG. 14A, and a result of simulating a location at which screen 108 moves by being driven with the above drive signal.

In the case of FIG. 14C, periodic signal generating circuit 231 in FIG. 13B outputs a signal waveform corresponding to the current value in FIG. 14A. Meanwhile, acceleration/deceleration signal generating circuit 232 in FIG. 13B outputs a signal waveform corresponding to the current value in FIG. 14B. Then, adder 233 in FIG. 13B superimposes both signals and enters the resultant signal in current control circuit 234. In this way, a drive signal having a current value in FIG. 14C is generated.

Current control circuit 234 applies the drive signal (current value) generated in the above manner to coil 305 in drive section 109, so that screen 108 can move while sequentially heading for the locations corresponding to the target values and passing over surrounding regions of these locations, as illustrated in FIG. 14C. In addition, screen 108 stops in the vicinity of the 2.0 mm location, which is a target location, over stop period T1.

In the signal pattern illustrated in FIG. 14B, waveform signal A23 having a negative amplitude which follows waveform signal A22 applies propulsion to screen 108 so that screen 108 moves along the reverse moving route at an increased speed. As a result, screen 108 in the example of FIG. 14C moves along the reverse moving route at a higher speed than that in the example of FIG. 14A after stop period T1 has passed. In addition, the termination time of a drive signal in the example of FIG. 14C coincides with that of drive signal in the example of FIG. 14A. The periodicity of the drive signal is thereby maintained. The negative amplitude of waveform signal A23 in FIG. 14B is increased as stop period T1 is prolonged, so that the periodicity of the drive signal is maintained.

In this exemplary embodiment, as described above, screen drive circuit 214 generates a drive signal for moving screen 108 by superimposing, at a stop timing of screen 108, an acceleration/deceleration signal for stopping screen 108 upon a periodic signal for causing screen 108 to reciprocate monotonously over a predetermined period. Generating the drive signal in this manner can smoothly position screen 108 at a stop location without causing excessive vibrations of screen 108 in the vicinity of the stop location, as opposed to Comparative Example. Therefore, even if screen 108 is elastically supported by plate spring 304 as illustrated in FIG. 3A, this configuration can reduce the risk that screen 108 produces resonance upon stopping and greatly oscillates at the stop location. Consequently, it is possible to appropriately display vertical image M2, which is an image that has no depth, over a stop period of screen 108.

In the example of FIG. 14C, screen 108 stops at single location. If screen 108 stops at a plurality of locations, however, screen drive circuit 214 may superimpose the acceleration/deceleration signal having a waveform illustrated in FIG. 14B upon the drive signal (periodic signal) illustrated in FIG. 14A at timings related to the respective stop locations. In this case, screen drive circuit 214 may superimpose the acceleration/deceleration signal upon the drive signal in accordance with control signal Cs from image processing circuit 201 illustrated in FIG. 13B. It should be noted that the number of stop locations that can be set is limited to the number of times that the waveform signal in FIG. 14B can be superimposed during the reverse moving period of the periodic signal in FIG. 14A.

In this exemplary embodiment, screen drive circuit 214 generates a drive signal without feedback about an actual location to which screen 108 has moved during each period of the drive signal. Therefore, there are cases where the last stop location of screen 108 on the forward moving route or on the reverse moving route is shifted from a normal location due to disturbance, for example. If the last stop location of screen 108 on the forward moving route or on the reverse moving route is shifted from a normal location, drive section 109 may fail to drive screen 108 with a normal stroke.

For example, as illustrated in FIG. 12A, suppose during a first reverse moving period, the last stop location of screen 108 is displaced, by amount ΔP, in a direction from initial location Ps0 to farthest location Ps1 due to disturbance Ds. For the next forward moving period, screen 108 needs to resume moving at location Ps0', which is shifted from normal initial location Ps0 by amount ΔP. Therefore, for this next forward moving period, the last stop location of screen 108 is shifted from normal farthest location Ps1 by amount ΔP. Likewise, for the next reverse moving period, the last stop location of screen 108 is shifted from normal initial location Ps0 by amount ΔP. The stop location is also shifted from normal stop location Ps2 by amount ΔP. These locational shifts are maintained for subsequent periods of the drive signal. This disadvantage may also occur when the last stop location of screen 108 is shifted during the forward moving period due to disturbance.

To address the above disadvantage, in this exemplary embodiment, periodic signal generating circuit 231 receives a location signal from the encoder in drive section 109, as illustrated in FIG. 13B. Then, periodic signal generating circuit 231 monitors the last stop locations of screen 108 on the forward moving route and on the reverse moving route. If the last stop location of screen 108 on the forward moving route is shifted from normal farthest location Ps1 or if the last stop location of screen 108 on the reverse moving route is shifted from normal initial location Ps0, periodic signal generating circuit 231 adjusts an output signal for the forward moving period so as to correct the positional shift. That is to say, periodic signal generating circuit 231 determines whether the peak value (indicating the last stop location on the forward moving route) and the bottom value (indicating the last stop location on the reverse moving route) of a location signal acquired from drive section 109 match the corresponding limits of a stroke range of the reciprocation of screen 108 and then adjusts a waveform of a periodic signal, based on the determination result.

For example, as illustrated in FIG. 12A, suppose the last stop location of screen 108 on the reverse moving route is shifted from normal initial location Ps0 by amount ΔP, due to disturbance Ds. Periodic signal generating circuit 231 adjusts an output signal for the next forward moving period in order to decrease a moving speed of screen 108 by an amount required to correct the positional shift. More specifically, periodic signal generating circuit 231 adjusts a normal current value signal illustrated in FIG. 14A by decreasing the amplitudes of waveform signals A11 and A12. Decreasing the amplitude of waveform signal A11 can cause screen 108 to resume moving more gently than usual; decreasing the amplitude of waveform signal A12 can cause screen 108 to move at a lower speed than usual. By adjusting the current value signal in this manner, as illustrated in FIG. 12B, the last stop location of screen 108 on the forward moving route for the next period coincides with normal farthest location Ps1. Then, periodic signal generating circuit 231 outputs a signal waveform that is the same as a normal signal waveform for the next reverse moving period. As a result, the last stop location of screen 108 on the reverse moving route coincides with normal initial location Ps0, and the stop location of screen 108 coincides with normal stop location Ps2.

After having corrected the positional shift, periodic signal generating circuit 231 outputs a signal that is the same as a normal signal over both a forward moving period and a reverse moving period. After that, periodic signal generating circuit 231 continues to monitor location signals output from the encoder in drive section 109. Then, every time detecting that the last stop location of screen 108 on the forward moving route or on the reverse moving route is shifted, periodic signal generating circuit 231 performs the above correction operation again.

For example, suppose disturbance occurs during the forward moving period and causes the last stop location of screen 108 on the forward moving route to be shifted from farthest location Ps1. Similar to the above, periodic signal generating circuit 231 adjusts an output signal for the next forward moving period so as to decrease a moving speed of screen 108 by an amount required to correct the positional shift. With this adjustment, the last stop location of screen 108 on the forward moving route coincides with normal farthest location Ps1, and the last stop location of screen 108 on the reverse moving route coincides with normal initial location Ps0.

The drive signal applied to coil 305 in drive section 109 is preferably a current signal, and therefore the amplifier is preferably a current amplifier circuit. One reason is that if a voltage amplifier circuit is used, the property of the coil may be varied due to temperature change and a variation in a resistance caused by this temperature change. In this case, a phase of the waveform of a drive signal might change, causing a movement of the screen to greatly differ from a movement based on the drive signal table.

<Effect of Secondary Exemplary Embodiment>

The second exemplary embodiment above produces effects described below.

The image display device superimposes, at a timing of stopping screen 108, an acceleration/deceleration signal (see FIG. 14B) for stopping screen 108 upon a periodic signal (see FIG. 14A) for causing screen 108 to reciprocate monotonously over a predetermined period. As a result of this superimposition, a drive signal (see FIG. 14C) for moving screen 108 is generated. Using this drive signal can reduce the risk of screen 108 excessively vibrating in the vicinity of a stop location. Consequently, it is possible to smoothly position screen 108 that has moved at a high speed, at the stop location without causing any oscillations.

Thus, vertical image M2, which is an image that has no depth, can be appropriately displayed.

The image display device sets a forward moving period between time t0 and time t1 in FIG. 8A to a period over which screen 108 moves monotonously to display depth image M1. In addition, the image display device sets a reverse moving period between time t1 and time t4 in FIG. 8A to a period over which screen 108 timely stops to display vertical image M2. Setting the forward and reverse moving periods in this manner can smoothly display both depth image M1 and vertical image M2 through a simple process.

As illustrated in FIG. 8A, the image display device sets the reverse moving period during which screen 108 stops to be longer than the forward moving period over which screen 108 does not stop. Therefore, the image display device can set a large number of stop periods over which screen 108 stops, within the reverse moving period. Thus, vertical image M2 can be effectively disposed within a displayed image.

If screen 108 causes any positional shift due to disturbance Ds, for example, as illustrated in FIG. 12B, the image display device adjusts a signal to be output from periodic signal generating circuit 231 in accordance with the positional shift of screen 108, thereby correcting the positional shift. In this way, the image display device can display both depth image M1 and vertical image M2 at appropriate locations, independently of an occurrence of disturbance Ds, for example.

Up to this point, the exemplary embodiments of the present disclosure have been described; however, the present disclosure is not limited to the exemplary embodiments described above. Likewise, exemplary application of the present disclosure is not limited to that of the exemplary embodiments; various modifications may be possible.

In the exemplary embodiments above, when screen 108 moves along a forward moving route that is a part of a reciprocation route, the image display device displays depth image M1. When screen 108 moves along a reverse moving route that is the remaining part of the reciprocation route, the image display device temporarily stops screen 108 and displays vertical image M2. Alternatively, for example, the image display device may temporarily stop screen 108 on the forward moving route and display vertical image M2, and may display depth image M1 while moving screen 108 monotonously along the reverse moving route. In this case, the image display device may superimpose an acceleration/deceleration signal in FIG. 14B upon a drive signal at a timing of moving screen 108 during the forward moving period. Moreover, the image display device may set the forward moving period to be longer than the reverse moving period, so that a large number of stop periods can be set within the forward moving period.

Up to this point, the exemplary embodiments of the present disclosure have been described; however, the present disclosure is not limited to the first and second exemplary embodiments described above. Likewise, exemplary application of the present disclosure is not limited to that of the first and second exemplary embodiments; various modifications may be possible.

In the first and second exemplary embodiments above, when screen 108 moves along a forward moving route that is a part of a reciprocation route, the image display device displays depth image M1. When screen 108 moves along a reverse moving route that is the remaining part of the reciprocation route, the image display device temporarily stops screen 108 and displays vertical image M2. Alternatively, for example, the image display device may temporarily stop screen 108 on the forward moving route and display vertical image M2, and may display depth image M1 while moving screen 108 monotonously along the reverse moving route. In this case, drive signal table 222 in the first exemplary embodiment may store generation information according to a waveform that causes screen 108 to stop during the forward moving period. In addition, current control circuit 221 in the first exemplary embodiment may generate a drive signal that causes screen 108 to stop during the forward moving period.

In the first and second exemplary embodiments, screen 108 includes microlens array 402, bead aggregation 403, opening portions 501, and canopies 502. However, screen 108 may employ any other configurations that screen 108 is scanned with a laser light beam to generate an image and creates the generated image as a virtual image. For example, screen 108 may have only microlens array 402 or may have a combination of a plurality of microlens arrays 402.

Although a configuration of screen 108 is not limited, the configuration of screen 108 in the first and second exemplary embodiments is advantageous in terms of the following features. When light source 101 emits laser light beams, the laser light beams are scattered randomly by bead aggregation 403 and then incident on microlens array 402. For this reason, the laser light beams pass through microlens array 402 with their optical paths separated from one another, so that the resultant laser light beams are less likely to be in phase. Consequently, screen 108 in the first and second exemplary embodiments is effective in reducing the risk that the laser light beams interferes with one another to generate speckle noise. Moreover, the configuration in which bead aggregation 403 scatters the laser light beams can mitigate the need to align bead aggregation 403 with microlens array 402, enabling bead aggregation 403 and microlens array 402 to be assembled by a simple process. Screen 108 in which bead aggregation 403 has beads 403a with smaller particle diameters can be more effective in reducing speckle noise. As described above, beads 403a preferably have different particle diameters.

In the first and second exemplary embodiments of the present disclosure, the image display device is applied to a head-up display to be mounted in vehicle 1. However, application of the present disclosure is not limited to on-vehicle image display devices and may be other types of image display devices.

Configurations of image display device 20 and illumination light generator 21 are not limited to those illustrated in FIG. 1C and FIG. 2 and may be modified as appropriate. Likewise, a configuration of drive section 109 that moves screen 108 is not limited to that illustrated in FIG. 3A and FIG. 3B and may be modified as appropriate.

Image processing circuit 201 and screen drive circuit 204, 214 in the first and second exemplary embodiments may be implemented using a single controller.

Exemplary embodiments of the present disclosure may be modified and varied in various ways within the scope of the technical ideas disclosed in the claims.

What is claimed is:
1. An image display device comprising:
a light source that emits a light beam;
a screen that is scanned with the light beam to create an image;
a scanning section that scans the screen with the light beam emitted from the light source;
an optical system that generates a virtual image by using the light beam that passes through the screen;

a drive section that moves the screen at least in parallel to a travel direction of the light beam; and
a screen drive circuit that drives the drive section,
wherein the screen drive circuit contains a drive signal table that stores an information group for use in generating a drive signal that causes the screen to reciprocate over a predetermined period,
the drive signal table is configured such that the information group is tailored to stop the screen at different stop locations over different stop periods, the stop locations being confined within a range of the reciprocation of the screen, and
the screen drive circuit selects first information in the drive signal table which is associated with displaying of the image and supplies the drive section with a first drive signal generated from the first information.

2. The image display device according to claim 1, wherein the information group stored in the drive signal table is configured such that the screen does not stop moving at a first movement stroke but stops moving at a second movement stroke, the screen being configured to move in a first direction with the first movement stroke, the screen being configured to move in a second direction with the second movement stroke, the first direction being opposite to the second direction.

3. The image display device according to claim 2, further comprising:
a light source drive circuit that drives the light source;
a scanning section drive circuit that drives the scanning section; and
a control circuit that controls the screen drive circuit, the light source drive circuit, and the scanning section drive circuit,
wherein the control circuit performs the control so that a virtual image of a depth image is generated at the first movement stroke and a virtual image of a vertical image is generated during a period in which the screen stops moving at the second movement stroke, the depth image having a depth, the vertical image having no depth.

4. The image display device according to claim 2, wherein the information group stored in the drive signal table is configured such that a period over which the screen moves in the second direction is longer than a period over which the screen moves in the first direction.

5. The image display device according to claim 1, wherein the drive section includes:
a holder that holds the screen;
a support part that supports the holder so that the holder can be elastically displaced; and
a set of coil and magnet that applies a driving force to the holder.

6. An image display device comprising:
a light source that emits a light beam;
a screen that is scanned with the light beam to create an image;
a scanning section that scans the screen with the light beam emitted from the light source;
an optical system that generates a virtual image by using the light beam that has passed through the screen;
a drive section that moves the screen at least in parallel to a travel direction of the light beam; and
a screen drive circuit that drives the drive section,
wherein the screen drive circuit generates a drive signal by superimposing an acceleration/deceleration signal upon a periodic signal at a timing of stopping the screen, the drive signal being used to move the screen, the acceleration/deceleration signal being used to stop the screen, the periodic signal being used to cause the screen to reciprocate monotonously over a predetermined period.

7. The image display device according to claim 6, wherein the screen drive circuit does not stop the screen moving at a first movement stroke but stops the screen moving at a second movement stroke, the screen being configured to move in a first direction with the first movement stroke, the screen being configured to move in a second direction with the second movement stroke, the first direction being opposite to the second direction.

8. The image display device according to claim 7, further comprising:
a light source drive circuit that drives the light source;
a scanning section drive circuit that drives the scanning section; and
a control circuit that controls the screen drive circuit, the light source drive circuit, and the scanning section drive circuit,
wherein the control circuit performs the control so that a virtual image of a depth image is generated at the first movement stroke and a virtual image of a vertical image is generated during a period in which the screen stops moving at the second movement stroke, the depth image having a depth, the vertical image having no depth.

9. The image display device according to claim 7, wherein in the periodic signal, a period over which the screen moves in the second direction is longer than a period over which the screen moves in the first direction.

10. The image display device according to claim 6, wherein
the drive section outputs a location signal to the screen drive circuit, the location signal indicating a location of the screen, and
the screen drive circuit adjusts a waveform of the periodic signal, based on whether a peak value and a bottom value of the location signal acquired from the drive section match corresponding limits of a range in which the screen reciprocates.

11. The image display device according to claim 6, wherein
the drive section includes:
a holder that holds the screen;
a support part that supports the holder so that the holder can be elastically displaced; and
a set of coil and magnet that applies a driving force to the holder.

* * * * *